United States Patent
Lee et al.

(10) Patent No.: US 11,411,438 B2
(45) Date of Patent: Aug. 9, 2022

(54) WIRELESS POWER TRANSMISSION DEVICE, ELECTRONIC DEVICE CAPABLE OF WIRELESSLY RECEIVING POWER, AND CONTROL METHOD THEREOF

(71) Applicant: SAMSUNG ELECTRONICS CO., LTD., Suwon-si (KR)

(72) Inventors: Kyungwoo Lee, Suwon-si (KR); Gongbo Moon, Suwon-si (KR); Sungkweon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/270,288

(22) PCT Filed: Aug. 19, 2019

(86) PCT No.: PCT/KR2019/010498
§ 371 (c)(1),
(2) Date: Feb. 22, 2021

(87) PCT Pub. No.: WO2020/040505
PCT Pub. Date: Feb. 27, 2020

(65) Prior Publication Data
US 2021/0184508 A1    Jun. 17, 2021

(30) Foreign Application Priority Data
Aug. 23, 2018 (KR) .................. 10-2018-0098741

(51) Int. Cl.
*H02J 50/20* (2016.01)
*H02J 50/80* (2016.01)
*H02J 50/90* (2016.01)
*H02J 50/40* (2016.01)

(52) U.S. Cl.
CPC ............ *H02J 50/20* (2016.02); *H02J 50/402* (2020.01); *H02J 50/80* (2016.02); *H02J 50/90* (2016.02)

(58) Field of Classification Search
None
See application file for complete search history.

(56) References Cited

U.S. PATENT DOCUMENTS

| | | | |
|---|---|---|---|
| 9,906,080 B2 | 2/2018 | Zeine et al. | |
| 2010/0033021 A1* | 2/2010 | Bennett | H02J 50/12 307/104 |

(Continued)

FOREIGN PATENT DOCUMENTS

| | | |
|---|---|---|
| EP | 3 148 052 | 3/2017 |
| KR | 10-2016-0105798 | 9/2016 |

(Continued)

OTHER PUBLICATIONS

Extended Search Report dated Jun. 7, 2021 in counterpart European Patent Application No. 19852604.8.

(Continued)

*Primary Examiner* — Jared Fureman
*Assistant Examiner* — Joel Barnett
(74) *Attorney, Agent, or Firm* — Nixon & Vanderhye, P.C.

(57) ABSTRACT

According to various embodiments, provided is a wireless power transmission device comprising a plurality of power transmission antennas, a geomagnetic sensor, a processor, and a communications circuit, wherein the processor is configured to: set a coordinate system on the basis of geomagnetic sensing information from the geomagnetic sensor; control such that, for charging an electronic device, a first RF wave is formed under a first transmission condition through the plurality of power transmission antennas;

(Continued)

receive, from the electronic device and through the communications circuit, first information on a change in the position or location, or both, of the electronic device; at least on the basis of the first information, confirm the position or location, or both, of the electronic device in the coordinate system after the change of the electronic device; and control such that a second RF wave is formed under a second transmission condition through the plurality of power transmission antennas, wherein the second transmission condition is confirmed on the basis of the location or position, or both, of the electronic device after the change. Other various embodiments are possible.

13 Claims, 22 Drawing Sheets

(56) References Cited

U.S. PATENT DOCUMENTS

| | | |
|---|---|---|
| 2012/0001497 A1 | 1/2012 | Sada et al. |
| 2012/0082039 A1* | 4/2012 | Li ........................... G01S 3/14 370/252 |
| 2012/0274154 A1* | 11/2012 | DeLuca ................. H02J 7/025 307/149 |
| 2014/0217967 A1 | 8/2014 | Zeine et al. |
| 2015/0022022 A1 | 1/2015 | Zeine |
| 2016/0191121 A1 | 6/2016 | Bell et al. |
| 2016/0336804 A1 | 11/2016 | Son et al. |
| 2017/0085126 A1* | 3/2017 | Leabman ................ H02J 50/00 |
| 2017/0288475 A1 | 10/2017 | Lee et al. |
| 2017/0288739 A1 | 10/2017 | Shin et al. |
| 2018/0183259 A1 | 6/2018 | Lee et al. |
| 2018/0294673 A1* | 10/2018 | Bae ........................... H02J 7/02 |

FOREIGN PATENT DOCUMENTS

| | | |
|---|---|---|
| KR | 10-2017-0112896 | 10/2017 |
| KR | 10-2017-0142678 | 12/2017 |
| KR | 10-2018-0074425 | 7/2018 |

OTHER PUBLICATIONS

International Search Report for PCT/KR2019/010498, dated Nov. 25, 2019, 20 pages.
Written Opinion of the ISA for PCT/KR2019/010498, dated Nov. 25, 2019, 5 pages.

* cited by examiner

WIRELESS POWER TRANSMISSION DEVICE, ELECTRONIC DEVICE CAPABLE OF WIRELESSLY RECEIVING POWER, AND CONTROL METHOD THEREOF

CROSS-REFERENCE TO RELATED APPLICATION(S)

This application is the U.S. national phase of International Application No. PCT/KR2019/010498 filed 19 Aug. 2019, which designated the U.S. and claims priority to KR Patent Application No. 10-2018-0098741 filed 23 Aug. 2018, the entire contents of each of which are hereby incorporated by reference.

1. FIELD

Various embodiments relate to wireless power transmitters for wirelessly transmitting power, electronic devices for wirelessly receiving power, and methods for controlling the same.

2. DESCRIPTION OF THE RELATED ART

Portable digital communication devices have become a must-have item for everyone in modern era. Customers desire to receive various high-quality services anytime, anywhere. Recent development of Internet of Thing (IoT) technology bundles various sensors, home appliances, and communication devices up into a single network. A diversity of sensors require a wireless power transmission system for seamless operations.

Wireless power transmission may come in various types, such as magnetic induction, magnetic resonance, and electromagnetic waves, among which the electromagnetic wave type may advantageously work for remote power transmission as compared with the others.

Such electromagnetic wave type is primarily intended for remote power transmission and it matters to exactly grasp the location of remote power receivers and deliver power in a most efficient way.

SUMMARY

In order to determine a target for charging, e.g., an electronic device, a convention electromagnetic wave scheme forms radio frequency (RF) waves in multiple directions, receives information about power reception from the electronic device, and uses the received information to make such determination. However, the electronic device is highly likely to be moved by the user, rather than staying in one place. When the electronic device moves, the wireless power transmitter again forms RF waves in a plurality of directions, re-receives information related to the reception of power from the electronic device, and needs to re-determine the position of the electronic device using the information. In this case, a time is consumed until the position of the electronic device after the electronic device has been moved is determined and, during the time, charging may be discontinued.

According to various embodiments, there may be provided a wireless power transmitter that identifies an absolute coordinate system using a geo-magnetic sensor and adjusts the transmission conditions of radio frequency (RF) waves based on information associated with a movement in the absolute coordinate system, received from the electronic device, and a method for controlling the same.

According to various embodiments, there may be provided a wireless power transmitter comprising a plurality of power transmission antennas configured to form a radio frequency (RF) wave, a geo-magnetic sensor, a processor, and a communication circuit, wherein the processor is configured to configure a coordinate system based on, at least, geomagnetic sensing information from the geo-magnetic sensor, control to form a first RF wave under a first transmission condition, via the plurality of power transmission antennas, to charge an electronic device, receive first information about a variation in at least one of an orientation or a position of the electronic device, via the communication circuit, from the electronic device, identify at least one of a varied orientation or a varied position of the electronic device in the configured coordinate system, based on, at least, the first information, and control to form a second RF wave under a second transmission condition identified based on, at least, at least one of the varied orientation or position of the electronic device, via the plurality of power transmission antennas.

According to various embodiments, there may be provided a method for operating a wireless power transmitter comprising configuring a coordinate system based on, at least, geomagnetic sensing information from a geo-magnetic sensor of the wireless power transmitter, forming a first RF wave under a first transmission condition, to charge an electronic device, receiving first information about a variation in at least one of an orientation or a position of the electronic device, from the electronic device, identifying at least one of a varied orientation or a varied position of the electronic device in the configured coordinate system, based on, at least, the first information, and forming a second RF wave under a second transmission condition identified based on, at least, at least one of the varied orientation or the varied position of the electronic device.

According to various embodiments, there may be provided an electronic device wirelessly receiving power from a wireless power transmitter. The electronic device comprises a plurality of power reception antennas individually emitting a plurality of electrical signals using an RF wave formed by the wireless power transmitter, a plurality of phase detectors detecting the phase of each of the plurality of electrical signals individually output from the plurality of power reception antennas, a geo-magnetic sensor, at least one sensor outputting sensing information about a variation in at least one of the orientation or a position of the electronic device, a communication circuit, and a processor, wherein the processor may be configured to configure a coordinate system based on, at least, geo-magnetic sensing information from the geo-magnetic sensor, identify information about the direction of reception of the RF wave on the coordinate system, based on, at least, the phase of each of the plurality of electrical signals, transmit information about the direction of reception of the RF wave, via the communication circuit, to the wireless power transmitter, and transmit, to the wireless power transmitter via the communication circuit, the sensing information about the variation in at least one of the orientation or the position of the electronic device identified via the at least one sensor.

According to various embodiments, there may be provided an access point performing communication with an electronic device. The AP comprises a geo-magnetic sensor, a communication circuit forming a beam for communication with the electronic device and a processor, wherein the processor may be configured to configure a coordinate system based on, at least, geomagnetic sensing information from the geo-magnetic sensor, control to form a first beam under a first formation condition, via the communication circuit, receive, from the electronic device via the communication circuit, first information about a variation in at least one of an orientation or a position of the electronic device, identify at least one of a varied orientation or a varied position of the electronic device in the configured coordinate system based on, at least, the first information, and control to form, via the communication circuit, a second RF beam under a second formation condition identified based on, at least, at least one of the varied orientation or the varied position of the electronic device.

According to various embodiments, there may be provided a wireless power transmitter that identifies an absolute coordinate system using a geo-magnetic sensor and adjusts the transmission conditions of radio frequency (RF) waves based on information associated with a movement in the absolute coordinate system, received from the electronic device, and a method for controlling the same. Thus, the time consumed to detect an electronic device when the electronic device is moved may be reduced, and wireless power transmission/reception may be carried out at relatively high efficiency.

DETAILED DESCRIPTION

Figure 1:
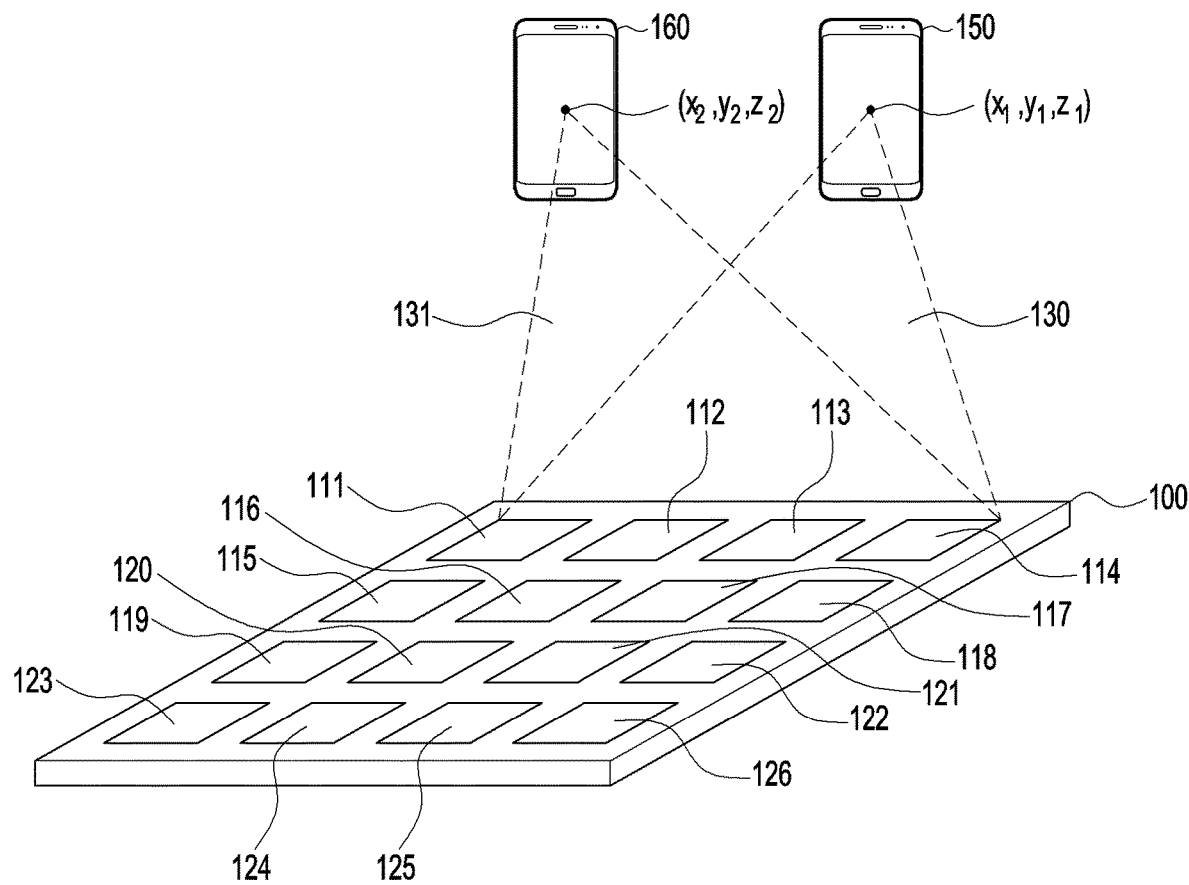
FIG. 1 is a concept view illustrating a wireless power transmission system according to various embodiments.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the wireless power transmitter or electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad), or a body implantable device. In some embodiments, examples of the wireless power transmitter or electronic device may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a media box, a gaming console, an electronic dictionary, an electronic key, a camcorder, or an electronic picture frame.

According to various embodiments of the present disclosure, examples of the wireless power transmitter or electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs) of financial organizations, point of sales (POS) devices of stores, or Internet of things devices (e.g., a bulb, various sensors, a sprinkler, a fire alarm, a thermostat, a street light, a toaster, fitness equipment, a hot water tank, a heater, or a boiler). According to various embodiments of the disclosure, examples of the wireless power transmitter or the electronic device may at least one of part of furniture or building/structure, an electronic board, an electronic signature receiving device, a projector, or various measurement devices (e.g., devices for measuring water, electricity, gas, or electromagnetic waves). According to embodiments, the wireless power transmitter or electronic device may be flexible or may be a combination of the above-enumerated electronic devices. According to various embodiments, the wireless power transmitter or electronic device is not limited to the above-listed embodiments. As used herein, the term "user" may denote a human using the electronic device or another device (e.g., an artificial intelligent electronic device) using the wireless power transmitter or electronic device.

FIG. 1 is a concept view illustrating a wireless power transmission system according to various embodiments.

The wireless power transmitter 100 may wirelessly transmit power to at least one electronic device 150 or 160. According to various embodiments, the wireless power transmitter 100 may include a plurality of patch antennas 111 to 126. The patch antennas 111 to 126 are not limited as long as they each are an antenna capable of producing RF waves. At least one of the amplitude or phase of RF waves produced by the patch antennas 111 to 126 may be adjusted by the wireless power transmitter 100. For ease of description, the RF waves respectively generated by the patch antennas 111 to 126 are denoted sub-RF waves.

According to various embodiments, the wireless power transmitter 100 may adjust at least one of the amplitude or phase of each of the sub-RF waves generated by the patch antennas 111 to 126. Meanwhile, the sub-RF waves may interfere with one another. For example, the sub-RF waves may constructively interfere with one another at one point or destructively interfere at another point. According to various embodiments, the wireless power transmitter 100 may adjust at least one of the amplitude or phase of each of the sub-RF waves generated by the patch antennas 111 to 126 so that the sub-RF waves may constructively interfere with one another at a first point (x1, y1, z1).

For example, the wireless power transmitter 100 may determine that an electronic device 150 is positioned at the first point (x1, y1, z1). Here, the position of the electronic device 150 may be the position where, e.g., a power receiving antenna of the electronic device 150 is located. A configuration in which the wireless power transmitter 100 determines the position of the electronic device 150 is described below in greater detail. In order for the electronic device 150 to wirelessly receive power at a higher transmission efficiency, the sub-RF waves should constructively interfere with one another at the first point (x1, y1, z1). Accordingly, the wireless power transmitter 100 may control the patch antennas 111 to 126 so that the sub-RF waves may constructively interfere with one another at the first point (x1, y1, z1). Here, controlling the patch antennas 111 to 126 may mean controlling the magnitude of signals inputted to the patch antennas 111 to 126 or controlling the phase (or delay) of signals inputted to the patch antennas 111 to 126. Meanwhile, beamforming, a technique for controlling RF waves to be subject to constructive interference at a certain point, would readily be appreciated by one of ordinary skill in the art. It is also appreciated by one of ordinary skill in the art that the beamforming used herein is not particularly limited in type. For example, various beamforming methods may be adopted as disclosed in U.S. Patent Application Publication No. 2016/0099611, U.S. Patent Application Publication No. 2016/0099755, and U.S. Patent Application Publication No. 2016/0100124. A RF wave formed by beamforming may be denoted a pocket of energy.

Hence, a RF wave 130 formed by the sub-RF waves may have the maximum amplitude at the first point (x1, y1, z1), and thus, the electronic device 150 may receive power at a higher efficiency. Meanwhile, the wireless power transmitter 100 may detect that an electronic device 160 is positioned at a second point (x2, y2, z2). The wireless power transmitter 100 may control the patch antennas 111 to 126 so that the sub-RF waves may constructively interfere with one another at the second point (x2, y2, z2) in order to charge the electronic device 160. Hence, a RF wave 131 formed by the sub-RF waves may have the maximum amplitude at the second point (x2, y2, z2), and thus, the electronic device 160 may receive power at a higher efficiency.

Specifically, the electronic device 150 may be positioned relatively at a right side. In this case, the wireless power transmitter 100 may apply a relatively larger delay to sub-RF waves formed by the patch antennas (e.g., 114, 118, 122, and 126) positioned relatively at a right side. In other words, a predetermined time after the sub-RF waves are formed by patch antennas (e.g., 111, 115, 119, and 123) positioned relatively at a left side, sub-RF waves may be generated by the patch antennas (e.g., 114, 118, 122, and 126) positioned relatively at a right side. Thus, the sub-RF waves may simultaneously meet at a relatively right-side point. In other words, the sub-RF waves may constructively interfere with one another at the relatively right-side point. Where beamforming is conducted at a relatively middle point, the wireless power transmitter 100 may apply substantially the same delay to the left-side patch antennas (e.g., 111, 115, 119, and 123) and the right-side patch antennas (e.g., 114, 118, 122, and 126). Further, where beamforming is conducted at a relatively left-side point, the wireless power transmitter 100 may apply a larger delay to the left-side patch antennas (e.g., 111, 115, 119, and 123) than to the right-side patch antennas (e.g., 114, 118, 122, and 126). Meanwhile, according to various embodiments, the wireless power transmitter 100 may substantially simultaneously generate sub-RF waves through all of the patch antennas 111 to 126 and may perform beamforming by adjusting the phase corresponding to the above-described delay.

As set forth above, the wireless power transmitter 100 may determine the position of the electronic devices 150 and 160 and enable the sub-RF waves to constructively interfere with one another at the determined position, allowing for wireless charging at a higher transmission efficiency. Meanwhile, the wireless power transmitter 100 may be capable of high-transmission efficiency wireless charging only when it can exactly grasp the position of the electronic devices 150 and 160.

As used herein, "wireless power transmitter 100 or electronic device 150 performs a particular process" may mean, e.g., that a processor included in the wireless power transmitter 100 or electronic device 150 performs a particular process or controls other hardware to perform a particular process. As used herein, "wireless power transmitter 100 or electronic device 150 performs a particular process" may mean a specific piece of hardware performs a specific process without control by a processor included in the wireless power transmitter 100 or the electronic device 150. As used herein, "wireless power transmitter 100 (or electronic device 150) performs a particular process" may mean, e.g., that a processor or other piece of hardware performs the particular process as an instruction stored in a memory included in the wireless power transmitter 100 or the electronic device 150 is executed.

Figure 2A:
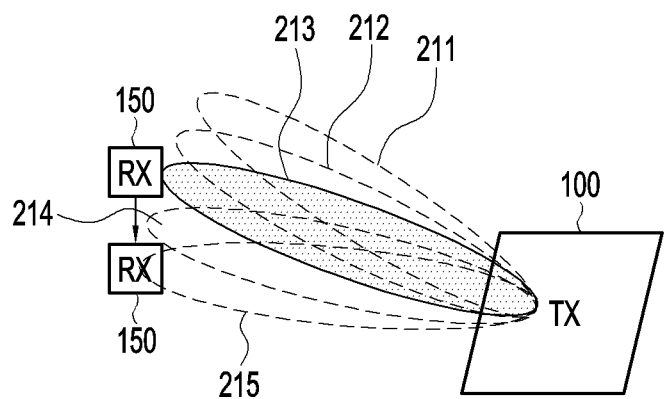
FIG. 2A is a view illustrating a beam steering operation when an electronic device moves according to various embodiments.
Figure 2B:
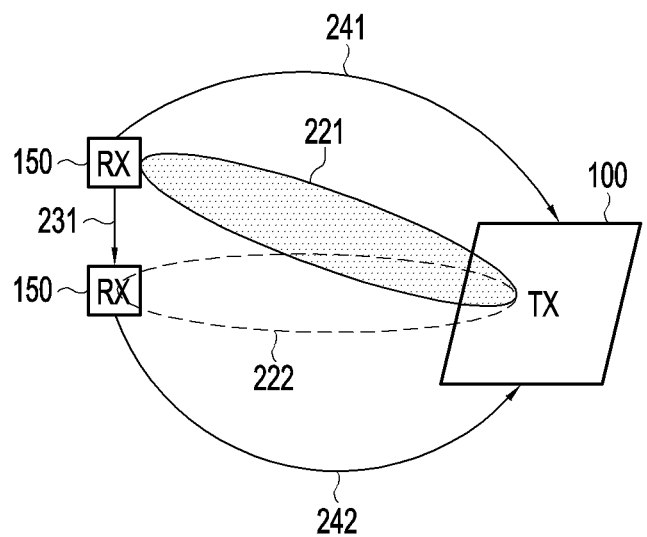
FIG. 2B is a view illustrating a beam steering operation when an electronic device moves according to various embodiments.

FIG. 2A is a view illustrating a beam steering operation when an electronic device moves according to various embodiments. FIG. 2B is a view illustrating a beam steering operation when an electronic device moves according to various embodiments.

Referring to FIG. 2A, A Wireless power transmitter TX 100 may form a plurality of RF waves 211, 212, 213, 213, and 215 sequentially or in such a manner that at least some of their formation times overlap. The wireless power transmitter 100 may adjust the direction of orientation of the RF waves 211, 212, 213, 214, and 215 by controlling at least one of the phase or amplitude of the electrical signal input to each of a plurality of patch antennas.

An electronic device 150 may include an antenna to convert the RF waves 211, 212, 213, 214, and 215 into electrical energy. The electronic device 150 may process (e.g., rectify or convert) the electrical energy output via the antenna, thereby charging the internal battery. The electronic device 150 may identify information about the received strength of the RF waves 211, 212, 213, 214, and 215 which may be referred to as received power-related information. Specifically, the received power-related information may be information related to the power received by the electronic device 150 from the wireless power transmitter. For example, the received power-related information may be, e.g., the voltage (e.g., the voltage Vrec at the output terminal of the rectification circuit or the voltage Vout at the output terminal of the DC/DC converter) at any point in the electronic device 150, current (e.g., the current Irec at the output terminal of the rectification circuit or the current Iout at the output terminal of the DC/DC converter), or strength of power. In other words, the received power-related information is not limited as long as it relates to the magnitude of power that the electronic device 150 receives from the wireless power transmitter 100.

The electronic device 150 may transmit a communication signal including the received power-related information to the wireless power transmitter 100. For example, upon receiving a first RF wave 211, the electronic device 150 may transmit first received power-related information to the wireless power transmitter 100. Further, upon receiving a second RF wave 211, the electronic device 150 may transmit second received power-related information to the wireless power transmitter 100. Thus, the wireless power transmitter 100 may receive each piece of received power-related information while forming each of the RF waves 211, 212, 213, 214, and 215. The wireless power transmitter 100 may perform wireless power transmission using the RF wave (e.g., the third RF wave 213) that has been formed in the period during which the received power-related information was largest. Accordingly, the electronic device 150 may wirelessly receive power at relatively high efficiency. The process in which the wireless power transmitter 100 forms each of the RF waves 211, 212, 213, 214, and 215 may be referred to as beam steering.

The electronic device 150 may be moved by the user. In this case, when the wireless power transmitter 100 performs wireless power transmission using the third RF wave 213, the electronic device 150 may receive a relatively low magnitude of power. The electronic device 150 may report the received power-related information to the wireless power transmitter 100 periodically or in response to detection of an event. Thus, the wireless power transmitter 100 may identify a reduction in the magnitude of power received by the electronic device 150 and may identify that a change in the transmission condition of the RF wave or movement of the electronic device 150 is required.

When no information about the movement of the electronic device 150 is identified, the wireless power transmitter 100 may perform beam steering again and, while forming each of the RF waves 211, 212, 213, 214, and 215, is needed to receive received power-related information again, and the wireless power transmitter 100 may perform wireless power transmission by forming the RF wave (e.g., the fifth RF wave 215) which has the largest reception magnitude based on the received power-related information. In another embodiment, when the received power-related information meets a predetermined condition, e.g., when Vrec is identified to be a threshold Vth or more, the wireless power transmitter 100 may stop beam steering and may immediately perform wireless charging using the corresponding RF wave. However, a reperforming of beam steering causes it to take time to identify the position of the electronic device 150 (or the RF wave transmission condition for forming the electronic device 150 in a relatively large size) and, during this course, the electronic device 150 may receive a relatively small magnitude of RF wave.

Referring to FIG. 2B, the wireless power transmitter 100 may wirelessly transmit power to the electronic device 150 using the first RF wave 221. When the wireless power transmitter 100 first determines a transmission condition of RF wave, the wireless power transmitter 100 may perform beam steering to determine a transmission condition as described above in connection with FIG. 2A, thereby forming the first RF wave 221.

The electronic device 150 may transmit a first communication signal 241 to the wireless power transmitter 100 while receiving power using the first RF wave 221. The first communication signal 241 may include at least one of the orientation, position, a variation in orientation, or a variation in position of the electronic device 150. According to various embodiments, the electronic device 150 may identify at least one of the orientation, position, variation in orientation, or variation in position in an absolute coordinate system with respect to the absolute coordinate system. The electronic device 150 may configure an absolute coordinate system (e.g., east north up, or ENU coordinate system) based on, at least, the information identified from the geo-magnetic sensor. According to various embodiments, the electronic device 150 may identify at least one of the orientation, position, variation in orientation, or variation in position with respect to the geo-magnetic field identified via the geo-magnetic sensor without configuring an absolute coordinate system. For convenience, the orientation, position, variation in orientation, or variation in position identified with respect to the geo-magnetic sensor may be referred to as an orientation, position, variation in orientation, or variation in position in the absolute coordinate system.

Even at the point after the electronic device 150 has moved (231), the electronic device 150 may transmit a second communication signal 242 including information about at least one of the orientation, position, variation in orientation, or variation in position of the electronic device 150. According to various embodiments, the electronic device 150 may identify at least one of the orientation, position, variation in orientation, or variation in position of the electronic device 150 based on the sensing value obtained via various sensors (e.g., a gyro sensor, three-axis linear accelerometer, or geo-magnetic sensor). For example, the electronic device 150 may identify at least one of orientation variation information or movement information of the electronic device 150 in the coordinate system, based on time-series sensing values obtained via various sensors and include the identified information in the second communication signal 242 and transmit it to the wireless power transmitter 100.

According to various embodiments, the wireless power transmitter 100 may identify the position of the point after the electronic device 150 has moved (231) based on, at least, the information contained in the second communication signal 242. The wireless power transmitter 100 may also configure the same absolute coordinate system as that of the electronic device 150. Thus, the wireless power transmitter 100 may identify the position of the electronic device 150 after movement (231). Since the wireless power transmitter 100 may identify the distance of movement of the electronic device 150 based on the orientation of the electronic device 150, the wireless power transmitter 100 may identify the position of the electronic device 150 after movement (231). In the position after movement (231), the wireless power transmitter 100 may adjust the transmission condition of the RF wave to allow the sub RF waves to cause constructive interference. Thus, the wireless power transmitter 100 may form a second RF wave 222, and the wireless power transmitter 100 may adjust the transmission condition of the RF wave while tracking the electronic device 150.

Although FIG. 2B illustrates that the wireless power transmitter 100 adjusts the transmission condition of the RF wave when the electronic device 150 has moved, this is merely an example. According to various embodiments, the wireless power transmitter 100 may also adjust the transmission condition of the RF wave as the orientation of the electronic device 150 is varied. For example, the electronic device 150 may identify a variation in orientation with respect to the absolute coordinate system and transmit information about the variation in orientation to the wireless power transmitter 100. The wireless power transmitter 100 may adjust the transmission condition of the RF wave based on, at least, the received orientation variation information.

Further, the wireless power transmitter 100 may primarily form the second RF wave 222 based on the information included in the communication signal received from the electronic device 150 and may additionally receive a communication signal including received power-related information from the electronic device 150. The wireless power transmitter 100 may later adjust the transmission condition of the RF wave depending on a predetermined degree of adjustment of beam steering. The wireless power transmitter 100 may receive received power-related information at the time of forming each of various RF waves. The wireless power transmitter 100 may perform charging under the RF wave transmission condition corresponding to the reception of power at the largest strength. In other words, the wireless power transmitter 100 may perform beam steering in a limited region, rather than in a predetermined entire area as shown in FIG. 2A and, thus, the time required for beam steering may be reduced. Beam steering in a limited region is described below in greater detail.

Figure 3:
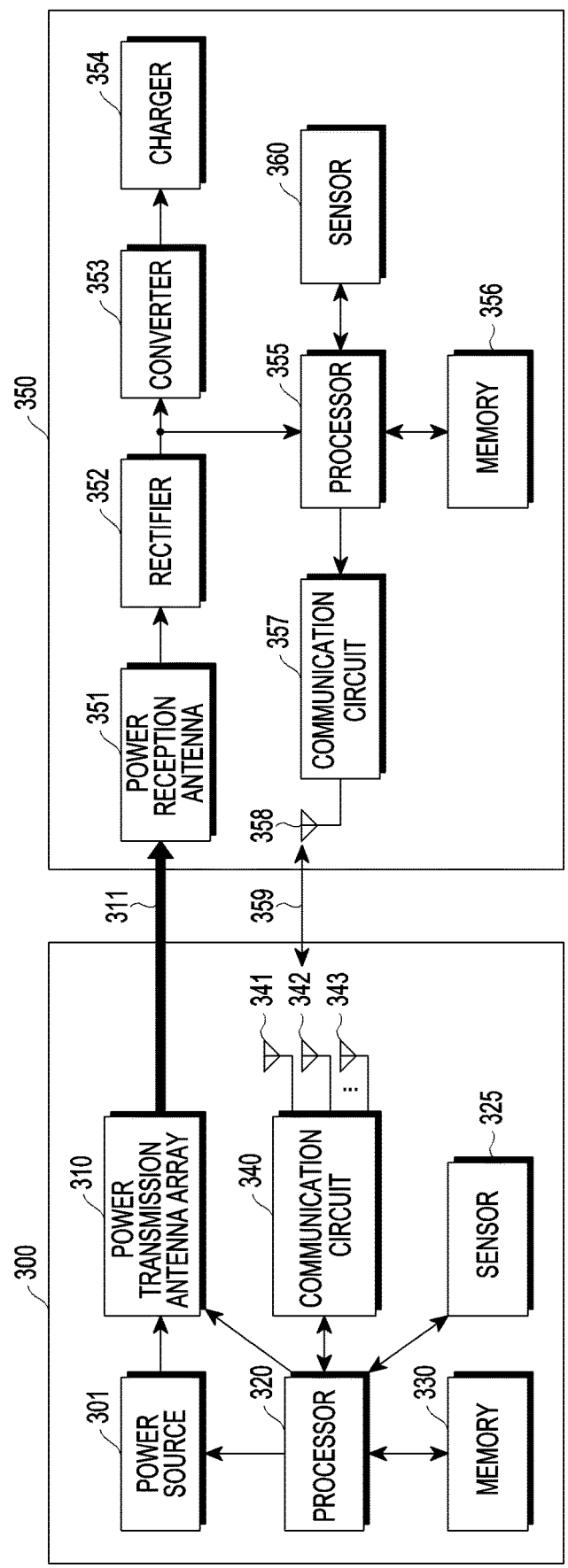
FIG. 3 is a block diagram illustrating a wireless power transmitter according to various embodiments.

FIG. 3 is a block diagram illustrating a wireless power transmitter according to various embodiments.

A wireless power transmitter 300 (e.g., the wireless power transmitter 100) may include a power source 301, an antenna array 310 for power transmission, a processor 320, a sensor 325, a memory 330, a communication circuit 340, and antennas 341 to 343 for communication. The electronic device 350 (e.g., the electronic device 150) is not limited as long as it is a device capable of wirelessly receiving power and may include an antenna 351 for power reception, a rectifier 352, a converter 353, a charger 354, a processor 355, a memory 356, a communication circuit 357, an antenna 358 for communication, and a sensor 360.

The power source 301 may provide power for transmission to the antenna array 310 for power transmission. The power source 301 may provide, e.g., direct current (DC) power, in which case the wireless power transmitter 300 may further include an inverter (not shown) that converts DC power into alternating current (AC) power and delivers the AC power to the antenna array 310 for power transmission. Meanwhile, according to various embodiments, the power source 301 may provide AC power to the antenna array 310 for power transmission.

The antenna array 310 for power transmission may include a plurality of patch antennas. For example, a plurality of patch antennas as shown in FIG. 1 may be included in the antenna array 310 for power transmission. The number or array form of the patch antennas is not limited. The antenna array 310 for power transmission may form a RF wave using the power received from the power source 301. The antenna array 310 for power transmission may form a RF wave in a particular direction under the control of the processor 320. Here, forming a RF wave in a particular direction may mean controlling at least one of the amplitude and phase of sub-RF waves so that the sub-RF waves constructively interfere with one another at a point in the particular direction. For example, the processor 320 may control each of phase shifters (not shown) individually connected to the patch antennas in the power transmission antenna array 310. Meanwhile, the antenna array 310 for power transmission is one for transmitting power and may be termed an antenna for power transmission.

The processor 320 may determine the direction in which the electronic device 350 is positioned and determine the direction of formation of the RF wave based on the determined direction. In other words, the processor 320 may control the patch antennas (or the phase shifters connected to the patch antennas) of the power transmission antenna array 310 that generates sub-RF waves so that the sub-RF waves constructively interfere with one another at, at least, one point in the determined direction. For example, the processor 320 may control at least one of the amplitude and phase of the sub-RF wave generated from each patch antenna by controlling the patch antennas or a control means connected with the patch antennas.

The communication circuit 340 may perform communication with the electronic device 350 via the communication antennas 341 to 343. Although FIG. 3 illustrates a plurality of communication antennas 341 to 343, this is merely an example, and only a single communication antenna may be implemented. At least one of the communication antennas 341 to 343 may transmit a communication signal 359, and the communication circuit 357 of the electronic device 350 may receive the communication signal via the communication antenna 358. The communication circuit 340 and the communication antennas 341, 342, and 343 may be manufactured based on various communication schemes, such as wireless-fidelity (Wi-Fi), Bluetooth, zig-bee, and Bluetooth low energy (BLE), which are not limited to a particular type.

As described above in connection with FIGS. 2A and 2B, the wireless power transmitter 300 may receive a communication signal 359 including at least one of the orientation, position, variation in orientation, or variation in position of the electronic device 350, from the electronic device 350. The wireless power transmitter 300 may vary the transmission condition of the RF wave 311 based on, at least, the received information.

For example, the processor 320 may configure an absolute coordinate system (e.g., ENU coordinate system) of the wireless power transmitter 300 based on the information (e.g., geo-magnetic information) received from the sensor 325. The sensor 325 may sense the geo-magnetic field. Although the ENU coordinate system is described as an example of the absolute coordinate system, it will be easily appreciated by one of ordinary skill in the art that the absolute coordinate system is not limited to a specific kind. Meanwhile, the sensor 360 of the electronic device 350 may also sense the geo-magnetic field and may configure an absolute coordinate system (e.g., ENU coordinate system) based on the sensing value from the sensor 360. Thus, the wireless power transmitter 300 and the electronic device 350 may share the same coordinate system. According to another embodiment, the wireless power transmitter 300 may not configure an absolute coordinate system but may set the direction of transmission of RF wave based on the sensed geo-magnetic vector. The electronic device 350 may set the orientation, position, variation in orientation, or variation in position of the electronic device 350 based on the sensed geo-magnetic vector. In this case, since the same geo-magnetic vector is used as a basis, the wireless power transmitter 100 may adjust the direction of transmission of the RF wave 311 according to the direction of movement of the electronic device 350. According to various embodiments, at least one of the wireless power transmitter 100 and the electronic device 150 may further perform a correction task to remove the surrounding extra geo-magnetic field. For example, an electronic device or metallic object which forms a magnetic field besides the geo-magnetic field may be positioned around at least one of the wireless power transmitter 100 and the electronic device 150 and may influence the wireless power transmitter or the electronic device 150. When installed, at least one of the wireless power transmitter 100 or the electronic device 150 may periodically or aperiodically perform calibration to remove the geo-magnetic field from the sensed geo-magnetic field. It will be easily appreciated by one of ordinary skill in the art that such calibration is not limited to a specific kind.

The processor 355 may identify information about the movement of the electronic device 350 (e.g., the position of the electronic device 350, a variation in the position of the electronic device 350, the orientation of the electronic device 350, or a variation in the orientation of the electronic device 350) obtained via the sensor 360. The sensor 360 may include, e.g., a gyro sensor or a three-axis linear sensor (e.g., an accelerometer). The processor 355 may identify at least one of the orientation, position, variation in orientation, or variation in position identified from at least one of the gyro sensor or three-axis linear sensor of the electronic device 350 in the absolute coordinate system identified from the geo-magnetic sensor of the electronic device 350.

The processor 355 may transmit a communication signal 359 including at least one of the orientation, position, variation in orientation, or variation in position of the electronic device 350 in the absolute coordinate system to the wireless power transmitter 300 via the communication circuit 357. The wireless power transmitter 300 may adjust the transmission condition of the RF wave based on the received information. Specifically, the processor 320 may identify information about at least one of the phase or amplitude of the electrical signal input to each of the patch antennas of the power transmission antenna array 310, designated corresponding to at least one of the orientation, position, variation in orientation, or variation in position of the electronic device 350 in the absolute coordinate system configured by the wireless power transmitter 300. The processor 320 may adjust at least one of the phase or amplitude of each of a plurality of electrical signals input to the power transmission antenna array 310 based on information about at least one of the phase or amplitude based on association information.

According to various embodiments, the communication signal 359 may include rated power information about the electronic device 350. The processor 320 may determine whether to charge the electronic device 350 based on at least one of the unique identifier, unique address, and rated power information of the electronic device 350. The processor 320 may include one or more of a central processing unit (CPU), an application processor (AP), or a communication processor (CP), and the processor 320 may be implemented as a micro-controller unit or a mini computer.

Further, the communication signal 359 may be used in the process for the wireless power transmitter 300 to identify the electronic device 350, the process of permitting power transmission to the electronic device 350, the process of sending a request for received power-related information to the electronic device 350, and the process of receiving the received power-related information from the electronic device 350. In other words, the communication signal 359 may be used in a process for a subscription, command, or request between the wireless power transmitter 300 and the electronic device 350.

As described above, although the electronic device 350 is moved, an RF wave 311 may be formed which may be received at a relatively large magnitude. The antenna 351 for power reception is not limited as long as it is an antenna capable of receiving RF waves. Further, the antenna 351 for power reception may be implemented in the form of an array of a plurality of antennas. The AC power received by the antenna 351 for power reception may be rectified into DC power by the rectifier 352. The converter 353 may convert the DC power into a voltage required and provide the voltage to the charger 354. The charger 354 may charge a battery (not shown). Although not shown, the converter 353 may provide the converted power to a power management integrated circuit (PMIC) (not shown), and the PMIC (not shown) may provide power to various hardware structures of the electronic device 350.

Meanwhile, the processor 355 may monitor the voltage at the output end of the rectifier 352. For example, the electronic device 350 may further include a voltage meter connected to the output end of the rectifier 352. The processor 355 may receive a voltage value from the voltage meter and monitor the voltage at the output end of the rectifier 352. The processor 355 may provide information containing the voltage value at the output end of the rectifier 352 to the communication circuit 357. Although the charger, converter, and PMIC may be implemented in different hardware units, at least two of them may be integrated into a single hardware unit. Meanwhile, the voltage meter may be implemented in various types, such as an electrodynamic instrument voltage meter, an electrostatic voltage meter, or a digital voltage meter, without limited in type thereto. The communication circuit 357 may send out the communication signal including received power-related information using the communication antenna 358. The received power-related information may be information associated with the magnitude of power received, such as, e.g., the voltage at the output end of the rectifier 352, and may contain a current at the output end of the rectifier 352. In this case, it will readily be appreciated by one of ordinary skill in the art that the electronic device 350 may further include a current meter capable of measuring current at the output end of the rectifier 352. The current meter may be implemented in various types, such as a DC current meter, AC current meter, or digital current meter, without limited in type thereto. Further, the received power-related information may be measured at any point of the electronic device 350, but not only at the output or input end of the rectifier 352.

Further, as set forth above, the processor 355 may send out a communication signal 359 containing identification information about the electronic device 350. The memory 356 may store a program or algorithm capable of controlling various hardware units of the electronic device 350. According to various embodiments, the memory 330 may store association information between at least one of the orientation or position of the electronic device 350 and the transmission condition of the RF wave. The transmission condition of the RF wave may include at least one of the degree of adjustment of the phase of each of the electrical signals input to the plurality of patch antennas of the power transmission antenna array 310 or the degree of amplification of each of the electrical signals.

Depending on the environment in which the wireless power transmitter 300 is placed, the transmission condition of the RF wave for the electronic device 350 to receive power at the maximum strength may be varied even in the same position according to the surrounding topographical/geographical features. The wireless power transmitter may previously identify information about the RF wave transmission condition under which the electronic device 350 may receive power at the maximum magnitude in a specific location, generate association information between at least one of the orientation or position of the electronic device 350 and the RF wave transmission condition based on the same and store the association information in the memory 330. Thereafter, the wireless power transmitter 300 may determine the RF wave transmission condition using the stored association information and at least one of the orientation or position of the electronic device 350 identified based on, at least, the communication signal 359. The wireless power transmitter 300 may identify the RF wave transmission condition for at least one of various orientations or positions and, based thereupon, may generate a RF wave transmission condition in at least one of other unidentified positions or orientations. For example, the wireless power transmitter 300 may identify the RF wave transmission condition corresponding to at least one of the unidentified orientation or position by applying an interpolation scheme to the RF wave transmission condition corresponding to at least one of the identified orientation or position. It will be easily appreciated by one of ordinary skill in the art that how to infer unidentified data is not limited to a specific way.

Figure 4:
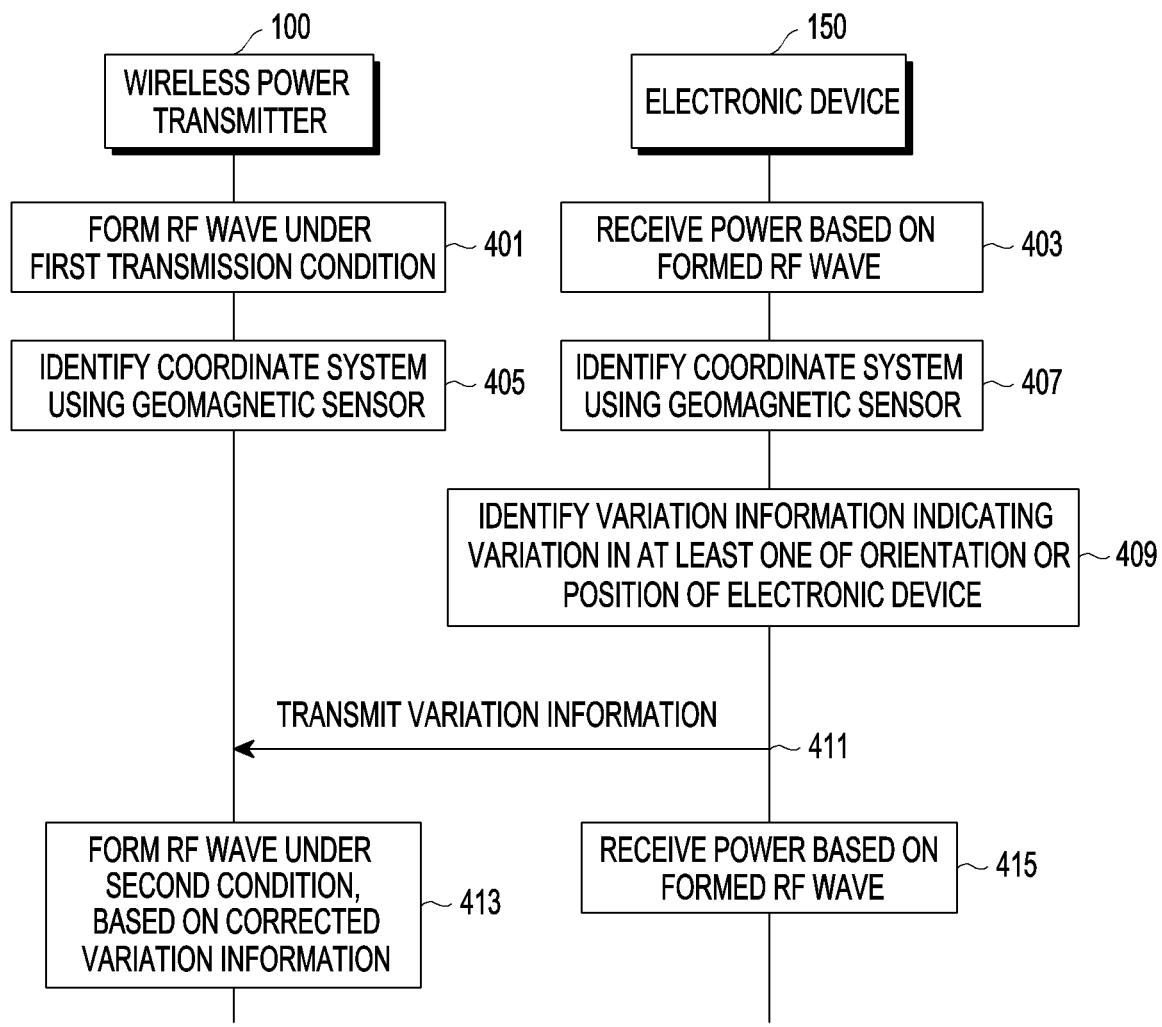
FIG. 4 is a flowchart illustrating a method of operating a wireless power transmitter and an electronic device according to various embodiments.
Figure 5A:
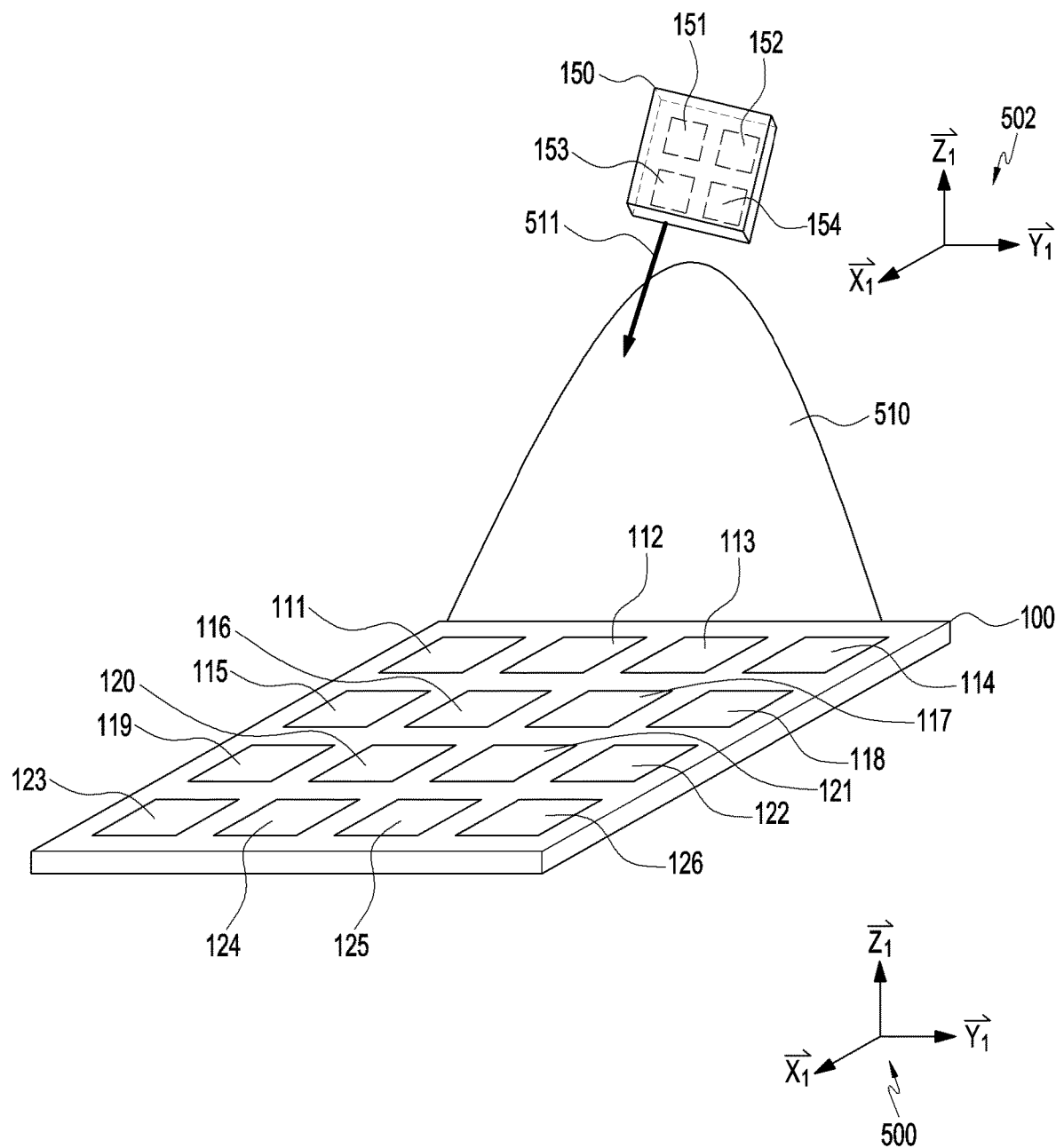
FIG. 5A is a view illustrating a wireless power transmitter that tracks a moving electronic device and performs wireless charging, according to various embodiments.
Figure 5B:
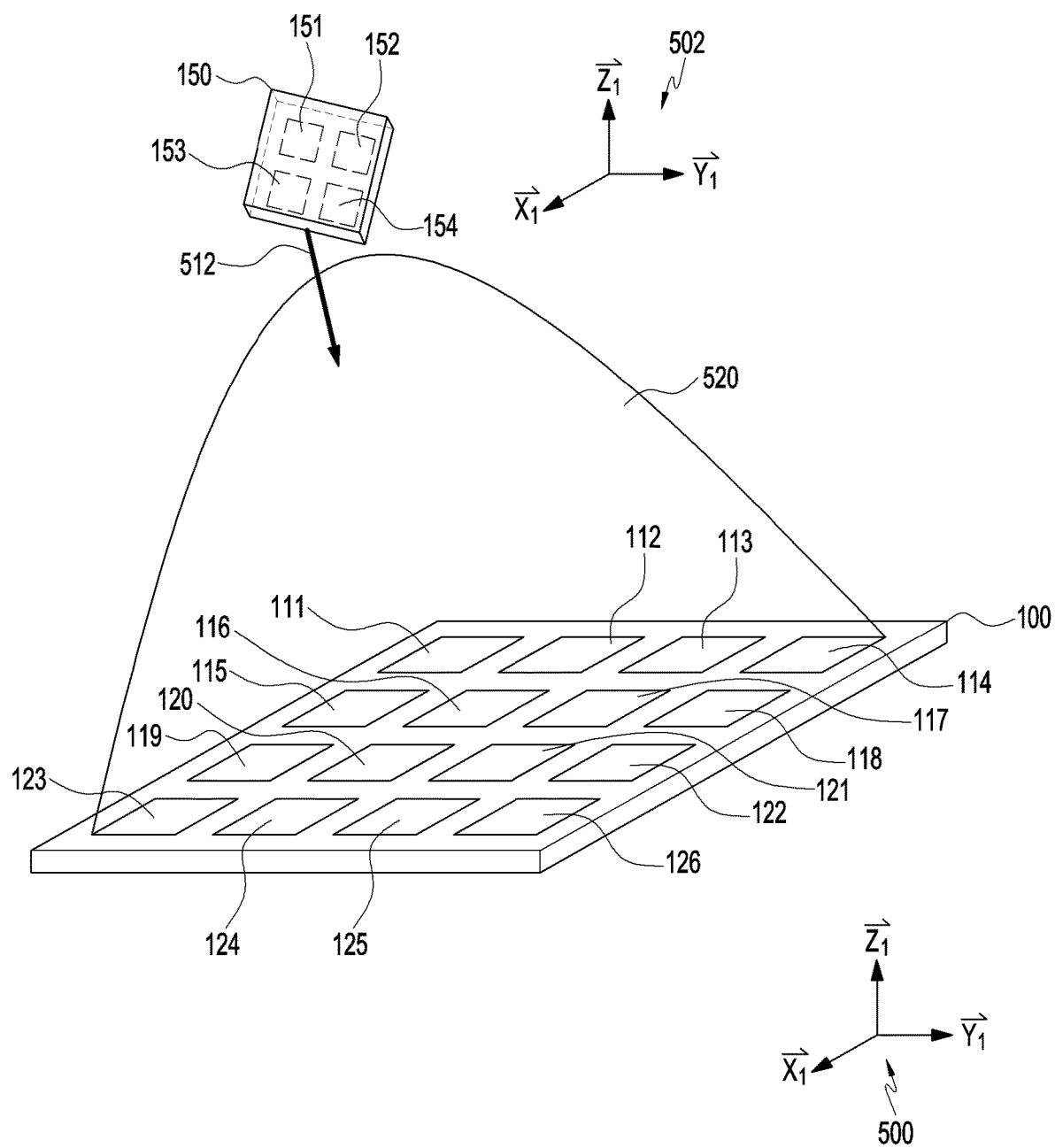
FIG. 5B is a view illustrating a wireless power transmitter that tracks a moving electronic device and performs wireless charging, according to various embodiments.

FIG. 4 is a flowchart illustrating a method of operating a wireless power transmitter and an electronic device according to various embodiments. The embodiment related to FIG. 4 is described in greater detail with reference to FIGS. 5a and 5b. FIG. 5A is a view illustrating a wireless power transmitter that tracks a moving electronic device and performs wireless charging, according to various embodiments. FIG. 5B is a view illustrating a wireless power transmitter that tracks a moving electronic device and performs wireless charging, according to various embodiments.

According to various embodiments, the wireless power transmitter 100 may form an RF wave under a first transmission condition in operation 401. For example, the wireless power transmitter 100 may identify the first transmission condition under which the electronic device 150 receives power at the largest magnitude, based on a plurality of pieces of received power-related information, as received, and beam steering. For example, the wireless power transmitter 100 may form a first RF wave 510 as shown in FIG. 5A. The wireless power transmitter 100 may identify at least one of the orientation or position of the electronic device 150 and, based thereupon, control at least one of the phase or amplitude of the electrical signal input to each of the patch antennas 111 to 126 of the wireless power transmitter 100 so that the first RF wave 510 is received at a relatively large strength by at least one patch antenna 151, 152, 153, and 154 included in the electronic device 150. The electronic device 150 may receive power based on the formed RF wave (e.g., the first RF wave 510 of FIG. 5) in operation 403.

In operation 405, the wireless power transmitter 100 may identify a coordinate system (e.g., ENU coordinate system) using a geo-magnetic sensor. In operation 407, the electronic device 150 may identify a coordinate system (e.g., ENU coordinate system) using a geo-magnetic sensor. When the same geo-magnetic field is applied to the wireless power transmitter 100 and the electronic device 150, the wireless power transmitter 100 and the electronic device 150 may share the same absolute coordinate system. Further, as described above, according to various embodiments, at least one of the wireless power transmitter 100 or the electronic device 150 may also perform a calibration task to remove the influence from the topographical or geographical feature emitting or absorbing an additional magnetic field to the surroundings. The coordinate system may be expressed in various formats such as a Cartesian coordinate system or a spherical coordinate system, and is not limited to a specific kind. Although in the embodiment of FIG. 4, it is illustrated that the wireless power transmitter 100 forms an RF wave under the first transmission condition and then identifies the absolute coordinate system, and the electronic device 100 performs charging using the RF wave and then identifies the absolute coordinate system, the time of identifying the absolute coordinate system is not limited thereto.

In operation 409, the electronic device 150 may identify variation information indicating a variation in at least one of the orientation or position of the electronic device 150. The electronic device 150 may identify the variation information with respect to the absolute coordinate system (e.g., ENU coordinate system) identified via the geo-magnetic sensor. In operation 411, the electronic device 150 may transmit the variation information to the wireless power transmitter 100.

In operation 413, the wireless power transmitter 100 may form an RF wave under a second transmission condition based on the variation information. In operation 415, the electronic device 150 may receive power based on the formed RF wave.

For example, as shown in FIG. 5A, the absolute coordinate system 500 of the wireless power transmitter 100 may be identical to the absolute coordinate system 502 of the electronic device 150 because they have been configured based on the geo-magnetic field. The electronic device 150 may transmit a first communication signal 511 including at least one of the orientation or position to the wireless power transmitter 100 in a first position. The electronic device 150 may move from the first position to a second position as shown in FIG. 5B. In the second position, the electronic device 150 may transmit a second communication signal 512 including information about at least one of the orientation, position, variation in orientation, or variation in position to the wireless power transmitter 100. The electronic device 150 may identify the degree of movement of the electronic device 150 via, e.g., a linear accelerometer. The electronic device 150 may identify the direction of movement of the electronic device based on orientation information identified via a gyro sensor. The electronic device 150 may identify the direction of movement and movement information in the absolute coordinate system 502, based on the orientation information and movement information. The electronic device 150 may compare the orientation in the first position with the orientation in the second position, thereby identifying the information about the variation in orientation. The electronic device 150 may transmit a second communication signal 512 including at least one of information about the variation in position or information about the variation in orientation to the wireless power transmitter 100.

The wireless power transmitter 100 may form a second RF wave 520 based on at least one of the variation in position or the variation in orientation included in the received second communication signal 512.

According to various embodiments, after forming the second RF wave 520, the wireless power transmitter 100 may finely adjust at least one of the direction of orientation of the RF wave or the magnitude of the RF wave. The wireless power transmitter 100 may finally determine the RF wave transmission condition based on received power-related information received from the electronic device 150 during the fine adjustment. For example, the wireless power transmitter 100 may determine that the transmission condition when the RF wave is formed which has the largest magnitude of received power of the electronic device 150 is the final RF wave transmission condition.

Figure 6:
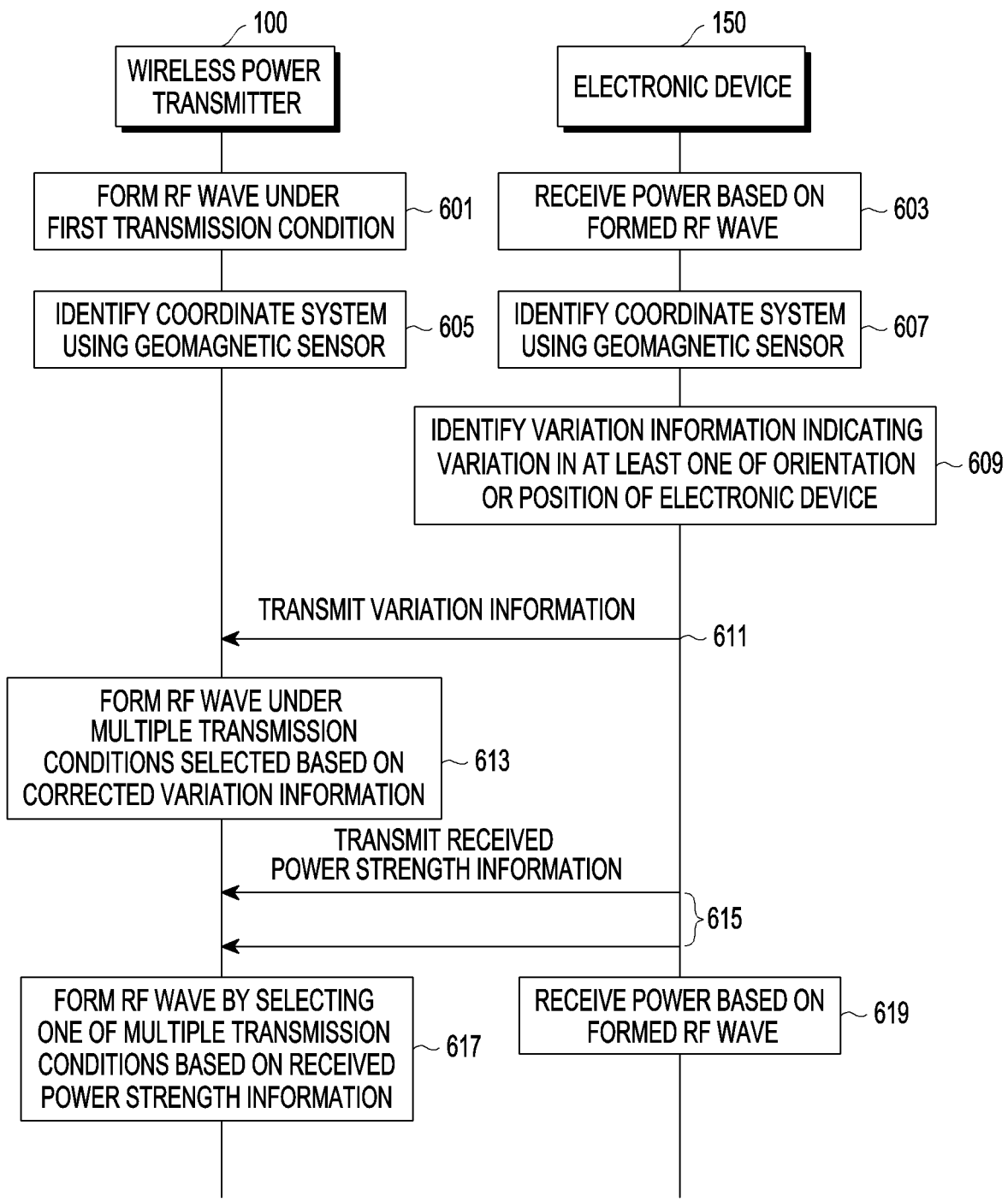
FIG. 6 is a flowchart illustrating a method of operating a wireless power transmitter and an electronic device according to various embodiments.
Figure 7A:
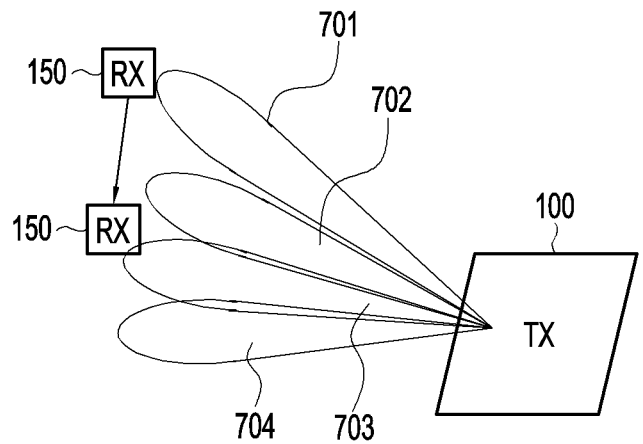
FIG. 7A is a view illustrating a wireless power transmitter performing a variation in a transmission condition of an RF wave and an electronic device performing charging using a formed RF wave, according to various embodiments.
Figure 7B:
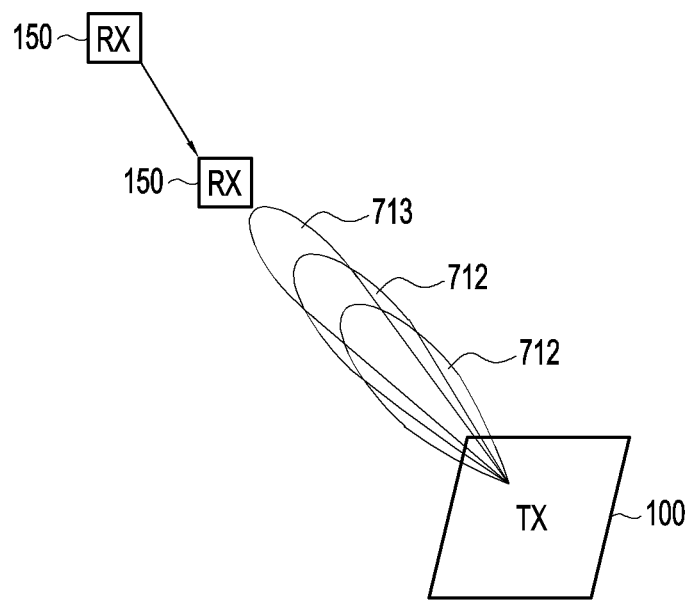
FIG. 7B is a view illustrating a wireless power transmitter performing a variation in a transmission condition of an RF wave and an electronic device performing charging using a formed RF wave, according to various embodiments.

FIG. 6 is a flowchart illustrating a method of operating a wireless power transmitter and an electronic device according to various embodiments. The embodiment related to FIG. 6 is described in greater detail with reference to FIGS. 7a and 7b. FIG. 7A is a view illustrating a wireless power transmitter performing a variation in a transmission condition of an RF wave and an electronic device performing charging using a formed RF wave, according to various embodiments. FIG. 7B is a view illustrating a wireless power transmitter performing a variation in a transmission condition of an RF wave and an electronic device performing charging using a formed RF wave, according to various embodiments. Meanwhile, what has been described above in connection with FIGS. 4 and 5A and 5B is described briefly.

According to various embodiments, the wireless power transmitter 100 may form an RF wave under a first transmission condition in operation 601. In operation 603, the electronic device 150 may receive power based on the formed RF wave. For example, as shown in FIG. 7A, the wireless power transmitter 100 may form a first RF wave 701, and the electronic device 150 may receive power using the first RF wave 701. In operation 605, the wireless power transmitter 100 may identify the coordinate system using the geo-magnetic sensor. In operation 607, the electronic device 150 may identify the coordinate system using the geo-magnetic sensor.

In operation 609, the electronic device 150 may identify variation information indicating a variation in at least one of the orientation or position of the electronic device 150 in the identified coordinate system. For example, as shown in FIG. 7A, the electronic device 150 may move in the absolute coordinate system. The electronic device 150 may identify variation information indicating a variation in at least one of the orientation or position of the electronic device 150 in the absolute coordinate system, based on the sensing values from various sensors included in the electronic device 150. In operation 611, the electronic device 150 may transmit the identified variation information to the wireless power transmitter 100.

According to various embodiments, the wireless power transmitter 100 may form RF waves under a plurality of transmission conditions selected based on the corrected variation information in operation 613. In operation 615, the electronic device 150 may receive each of a plurality of pieces of received power strength information during each of the periods when power is received using the RF waves formed according to the plurality of transmission conditions. Although FIG. 6 illustrates that the electronic device 150 reports the received power-related information after the wireless power transmitter 100 forms RF waves under a plurality of transmission conditions in operation 613, this is merely an example. According to various embodiments, the wireless power transmitter 100 may receive received power-related information from the electronic device 150 while forming an RF wave and may then form an RF wave under a different transmission condition and receive received power-related information again. Alternatively, after performing beam steering to form the RF waves according to the plurality of transmission conditions, the wireless power transmitter 100 may receive a plurality of pieces of received power-related information from the electronic device 150 via one communication signal or a plurality of communication signals.

As described above, the corrected variation information may indicate at least one of a variation in the position of the electronic device 150 or a variation in the orientation of the electronic device 150 in the coordinate system of the wireless power transmitter 100. Thus, the wireless power transmitter 100 may form the RF wave appropriate for at least one of the varied position or varied orientation of the electronic device 150. For example, as shown in FIG. 7A, the wireless power transmitter 100 may primarily form a second RF wave 702 based on the corrected variation information. The electronic device 150 may identify received power-related information (e.g., Vrec) while receiving power using the second RF wave 702. The electronic device 100 may transmit the received power-related information about the second RF wave 702 to the wireless power transmitter 100. Upon identifying the received power-related information about the second RF wave 702, the wireless power transmitter 150 may perform beam steering to thereby form a third RF wave 703. The electronic device 150 may transmit the received power-related information about the third RF wave 703 to the wireless power transmitter 100. Further, after forming a fourth RF wave 704, the wireless power transmitter 100 may receive received power-related information about the fourth RF wave 704. As described above, the wireless power transmitter 100 may receive the received power-related information about each of the second RF wave 702, the third RF wave 703, and the fourth RF wave 704 as one communication signal or as multiple communication signals. The wireless power transmitter 100 may identify that the received power-related information about, e.g., the third RF wave 703 has a value larger than the other pieces of received power-related information and may perform wireless charging using the third RF wave 703.

In other words, in operation 617, the wireless power transmitter 100 may select one among the plurality of transmission conditions based on the received power-related information and form an RF wave. In operation 619, the electronic device 150 may receive power based on the formed RF wave. Although in the embodiment of FIG. 6, the wireless power transmitter 100 performs beam steering to track the electronic device 150, the transmission condition of the RF wave primarily formed by the wireless power transmitter 100 according to the embodiment of FIG. 6 is determined based on the movement of the electronic device 150. Thus, tracking may be performed relatively quickly as compared with the beam steering for the entire area of FIG. 2A.

According to various embodiments, when the RF wave to be primarily formed is formed based on the movement, the wireless power transmitter 100 may perform finer beam steering. For example, the wireless power transmitter 100 may reduce the beam width as compared with the conventional art and form the second RF wave 702, the third RF wave 703, and the fourth RF wave 704, thereby enabling more precise orientation of RF waves.

FIG. 7B is a view illustrating beam steering by a wireless power transmitter 100 after an electronic device moves, according to another embodiment. In the embodiment of FIG. 7A, the wireless power transmitter 100 performs beam steering by varying the direction of the RF waves 702, 703, and 704. In the embodiment of FIG. 7B, the wireless power transmitter 100 may also perform beam steering by varying the strength of the RF waves 711, 712, and 713. For example, the wireless power transmitter 100 may identify at least one of the variation in position or variation in orientation of the electronic device 150, as corrected, and, based thereupon, primarily form the first RF wave 711. The wireless power transmitter 100 may form the second RF wave 712 by varying the amplification gain of at least one amplifier, with the phase delay maintained for each of the plurality of electrical signals individually input to the plurality of patch antennas. Or, the wireless power transmitter 100 may form the second RF wave 712 by varying the amplification gain of all the electrical signals, with the strength ratio maintained between the plurality of electrical signals individually input to the plurality of patch antennas.

The wireless power transmitter 100 may compare the plurality of pieces of received power-related information corresponding to the first RF wave 711, the second RF wave 712, and the third RF wave 713, respectively, thereby wirelessly charging the electronic device 150 using, e.g., the third RF wave 713.

Although FIGS. 7A and 7B illustrate that the wireless power transmitter 100 adjusts only the direction of RF waves or only the strength of the RF waves, this is merely an example. According to various embodiments, the wireless power transmitter 100 may vary the direction of the RF waves and then sequentially vary the strength of the RF waves, or the wireless power transmitter 100 may simultaneously vary the direction and strength of the RF waves. According to various embodiments, the wireless power transmitter 100 may determine whether to adjust the direction or strength of RF waves depending on the movement information about the electronic device 150 as identified.

Figure 8:
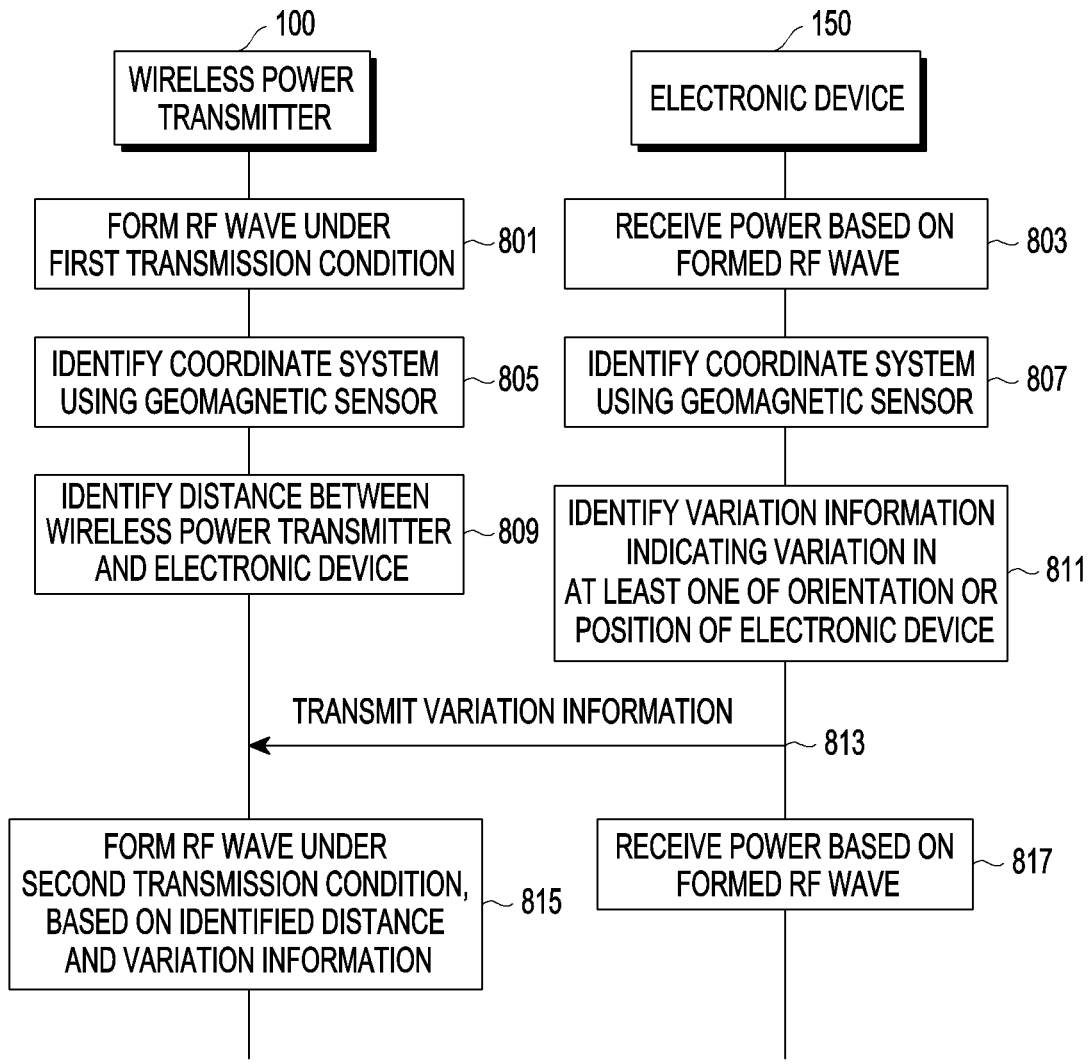
FIG. 8 is a flowchart illustrating a method for operating an electronic device according to various embodiments.
Figure 9:
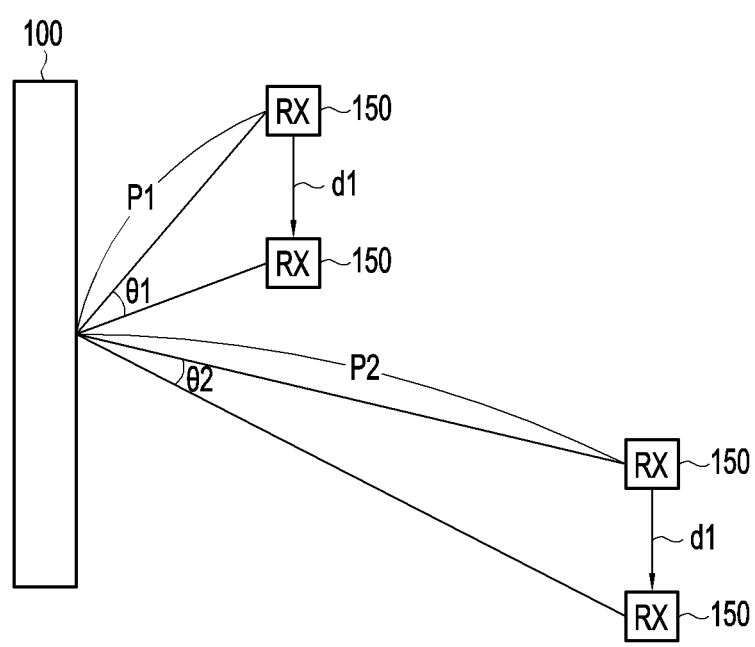
FIG. 9 is a view illustrating an example of adjusting an RF wave transmission condition of a wireless power transmitter according to various embodiments.

FIG. 8 is a flowchart illustrating a method for operating an electronic device according to various embodiments. The embodiment shown in FIG. 8 is described in greater detail with reference to FIG. 9. FIG. 9 is a view illustrating an example of adjusting an RF wave transmission condition of a wireless power transmitter according to various embodiments.

According to various embodiments, the wireless power transmitter 100 may form an RF wave under a first transmission condition in operation 801. In operation 803, the electronic device 150 may receive power based on the formed RF wave. In operation 805, the wireless power transmitter 100 may identify the coordinate system using the geo-magnetic sensor. In operation 807, the electronic device 150 may identify the coordinate system using the geomagnetic sensor.

According to various embodiments, the wireless power transmitter 100 may identify the distance between the wireless power transmitter 100 and the electronic device 150 in operation 809. The wireless power transmitter 100 may identify the distance between the wireless power transmitter 100 and the electronic device 150 according to various methods. For example, the wireless power transmitter 100 may identify the distance between the wireless power transmitter 100 and the electronic device 150 based on, at least, the received strength (e.g., RSSI) of the communication signal received from the electronic device 150. The communication signal may include information about the transmitted strength of the communication signal. The wireless power transmitter 100 may identify the distance between the wireless power transmitter 100 and the electronic device 150 based on, at least, the degree of attenuation of the received strength as compared with the transmitted strength. Or, the wireless power transmitter 100 may further include a time-of-flight (TOF) camera and may identify the distance between the wireless power transmitter 100 and the electronic device 150 based on, at least, information identified from the TOF camera. Or, the wireless power transmitter 100 may identify the distance between the wireless power transmitter 100 and the electronic device 150 based on, at least, the TOF from the time when the RF wave is formed to the time of reception of the RF wave reflected by the electronic device 150. Or, the wireless power transmitter 100 may identify the distance between the wireless power transmitter 100 and the electronic device 150 based on image analysis. The wireless power transmitter 100 may identify the distance between the wireless power transmitter 100 and the electronic device 150 in such a manner as to form a plurality of RF waves which is described below in greater detail with reference to FIG. 10.

In operation 811, the electronic device 150 may identify variation information indicating a variation in at least one of the orientation or position of the electronic device 150. In operation 813, the electronic device 150 may transmit the variation information to the wireless power transmitter 100.

In operation 815, the wireless power transmitter 100 may form an RF wave under a second transmission condition based on the variation information and the identified distance. In operation 817, the electronic device 150 may receive power based on the formed RF wave. For example, as shown in FIG. 9, it may be hypothesized that the electronic device 150 is a first distance P1 away from the wireless power transmitter 100. When the electronic device 150 moves a first displacement d1, the wireless power transmitter 100 may change the orientation angle of the RF wave by θ1. The wireless power transmitter 100 may identify the position of the electronic device 150 after the electronic device 150 is moved, based on the first distance P1, thereby identifying the degree of adjustment of the RF wave transmission condition, corresponding to the identified position after the movement. Or, it may be hypothesized that the electronic device 150 is a second distance P2 away from the wireless power transmitter 100. When the electronic device 150 moves the first displacement d1, the wireless power transmitter 100 may change the orientation angle of the RF wave by θ2. The wireless power transmitter 100 may identify the position of the electronic device 150 after the electronic device 150 is moved, based on the second distance P2, thereby identifying the degree of adjustment of the RF wave transmission condition, corresponding to the identified position after the movement. Thus, although the electronic device 150 moves the same displacement in the same direction, the degree of adjustment of the RF wave transmission condition may be varied depending on the distance between the electronic device 150 and the wireless power transmitter 100.

Figure 10:
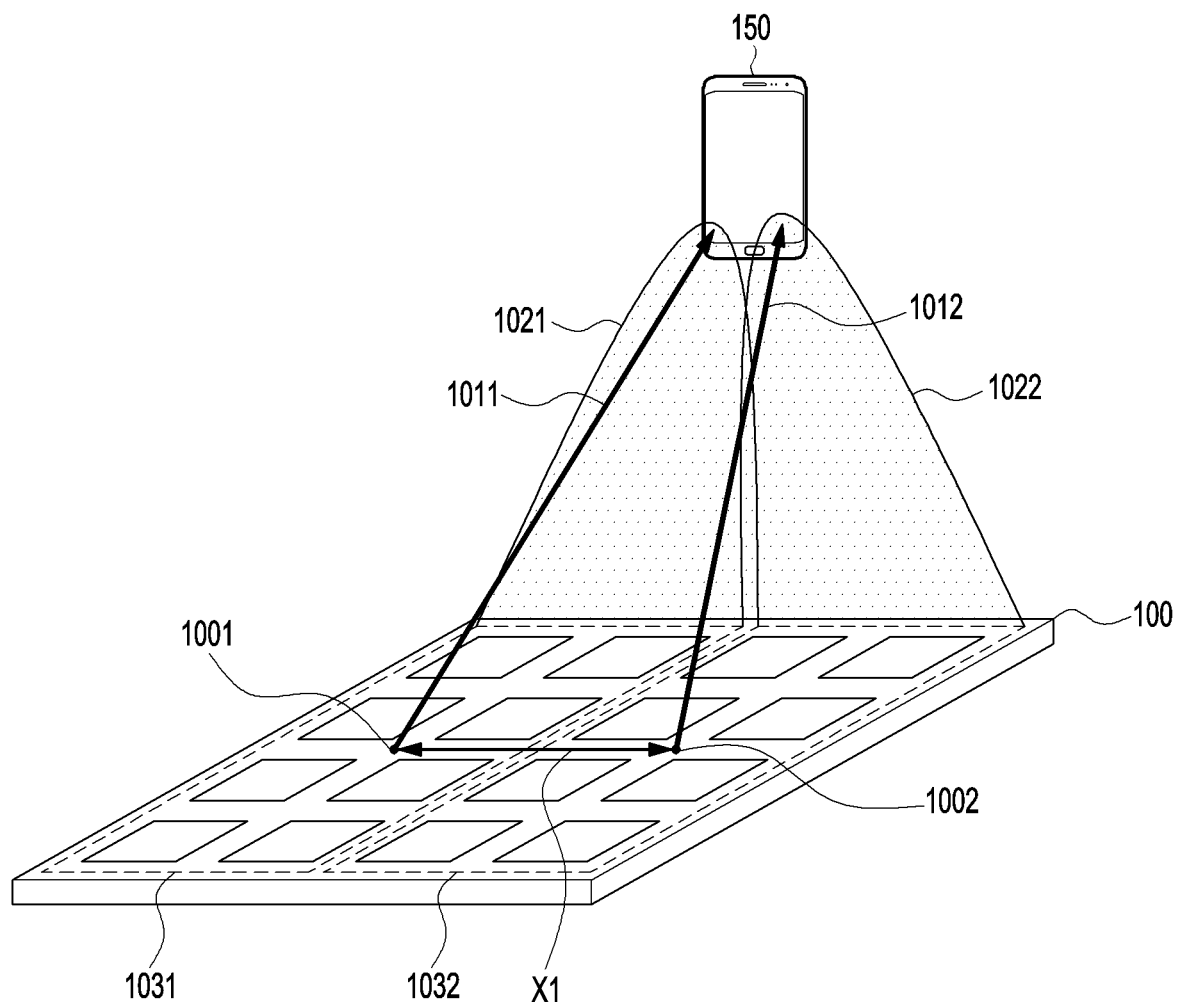
FIG. 10 is a view illustrating a wireless power transmitter identifying a distance to an electronic device according to various embodiments.

FIG. 10 is a view illustrating a wireless power transmitter identifying a distance to an electronic device according to various embodiments.

As shown in FIG. 10, the wireless power transmitter 100 may form a first RF wave 1021 under a first transmission condition using a first part 1031 of a plurality of patch antennas. The wireless power transmitter 100 may form a second RF wave 1022 under a second transmission condition using a second part 1032 of the plurality of patch antennas. The wireless power transmitter 100 may identify that, e.g., the electronic device 150 receives power at the maximum strength at the corresponding point, through the received power-related information. For example, the wireless power transmitter 100 may identify the first transmission condition and the second transmission condition when the received power becomes the maximum strength.

The wireless power transmitter 100 may identify the distance X1 between the first point 1001 indicating the first part 1031 and the second point 1002 indicating the second part 1032. The wireless power transmitter 100 may identify a first orientation vector 1011 of the first RF wave 1021 and identify a second orientation vector 1012 of the second RF wave 1022. The wireless power transmitter 100 may identify the position where a straight line passing the first point 1001 and having the first orientation vector 1011 crosses a straight line passing the second point 1002 and having the second orientation vector 1012. The wireless power transmitter 100 may identify that the electronic device 150 is placed at the crossing point. The distance between any one of the first point 1001 or second point 1002 of the wireless power transmitter 100 and the electronic device 150 may be identified. The wireless power transmitter 100 may use the identified distance as it is or may use the identified distance to identify the distance between another point (e.g., the center point of the patch antenna panel) and the electronic device 150. As described above, the wireless power transmitter 100 may identify the distance to the electronic device 150. Meanwhile, the above-described distance identifying method is merely an example, and how to identify the distance is not limited thereto.

Figure 11:
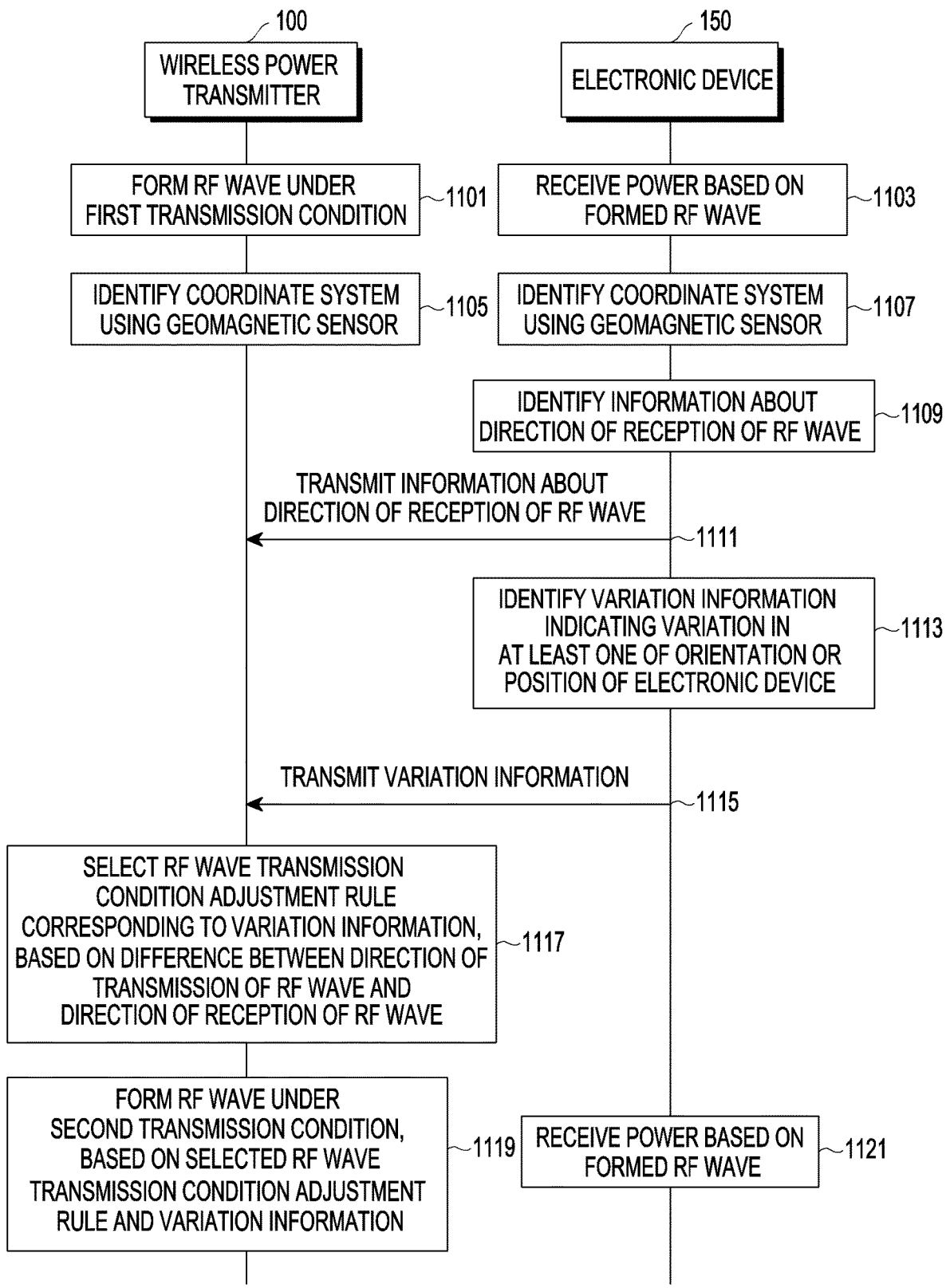
FIG. 11 is a flowchart illustrating a method of operating a wireless power transmitter and an electronic device according to various embodiments.
Figure 12:
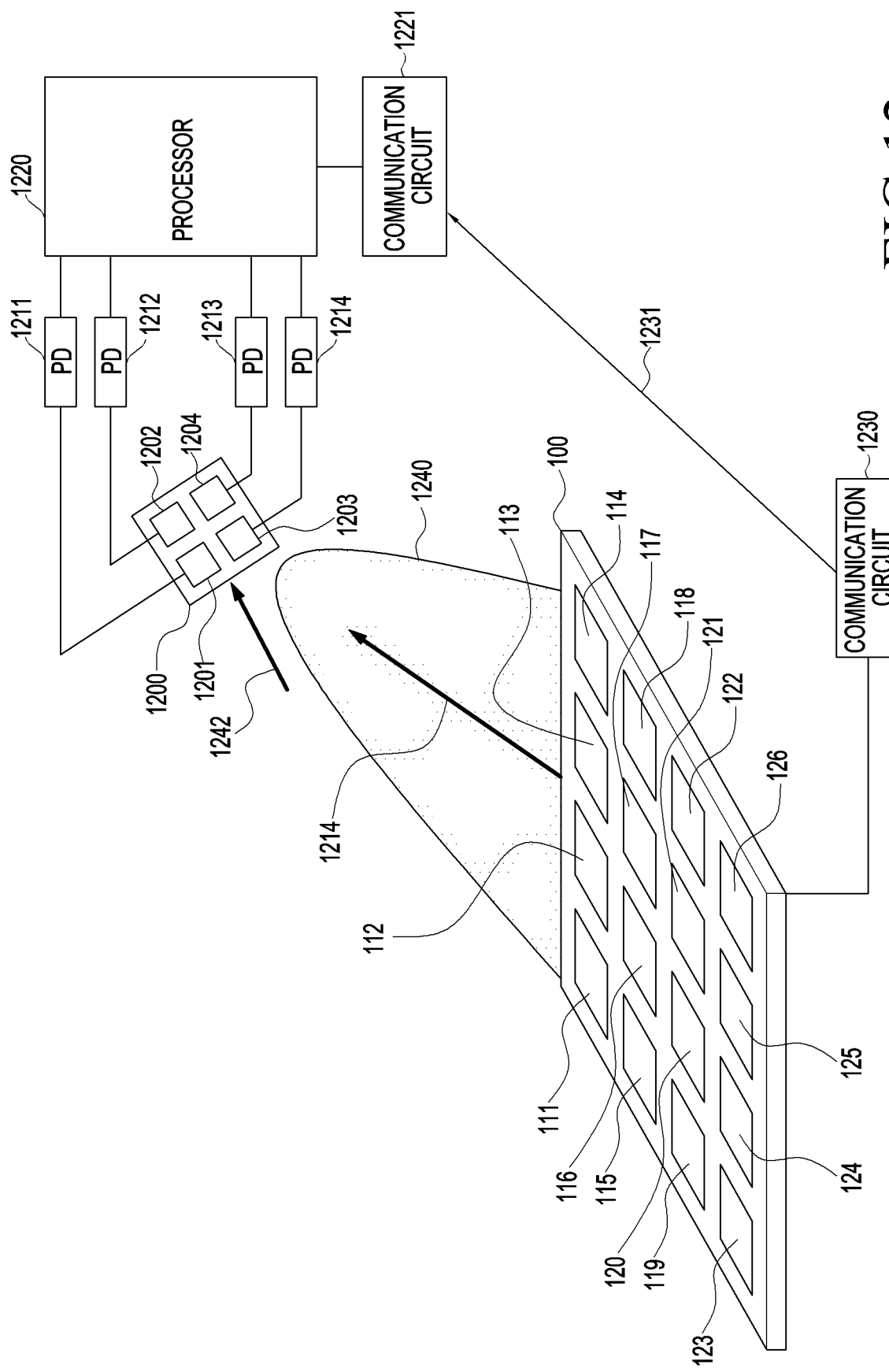
FIG. 12 is a view illustrating a wireless power transmitter and an electronic device according to various embodiments.

FIG. 11 is a flowchart illustrating a method of operating a wireless power transmitter and an electronic device according to various embodiments. The embodiment related to FIG. 11 is described in greater detail with reference to FIG. 12. FIG. 12 is a view illustrating a wireless power transmitter and an electronic device according to various embodiments.

Referring to FIG. 11, the wireless power transmitter 100 may form an RF wave under a first transmission condition in operation 1101. In operation 1103, the electronic device 150 may receive power based on the formed RF wave. In operation 1105, the wireless power transmitter 100 may identify the coordinate system using the geo-magnetic sensor. In operation 1107, the electronic device 150 may identify the coordinate system using the geo-magnetic sensor.

In operation 1109, the electronic device 150 may identify information about the direction of reception of the RF wave. For example, as shown in FIG. 12, the electronic device 150 may include an antenna array 1200 for reception, at least one phase detector 1211, 1212, 1213, and 1214, a processor 1220, and a communication circuit 1221. Further, the wireless power transmitter 100 may include a plurality of patch antennas 111 to 126 and a communication circuit 1230. The wireless power transmitter 100 may form an RF wave 1240, e.g., in a first transmission direction 1214.

The electronic device 150 may identify information about the reception direction 942 of the RF wave. For example, as shown in FIG. 12, the electronic device 150 may identify the phase of each of the electrical signals individually output from the plurality of patch antennas 1201, 1202, 1203, and 1204 using the phase detectors 1211, 1212, 1213, and 1214. The electronic device 150 may identify information about the direction of reception of the RF wave 1240 (e.g., the reception direction vector 1242) based on the difference between the respective phases of the electrical signals.

In operation 1111, the wireless power transmitter 100 may transmit the information about the direction of reception of RF wave. For example, the processor 920 may transfer the information about the direction of reception of the RF wave 1240 (e.g., the reception direction vector 1242) through the communication circuit 1221 to the communication circuit 930 of the wireless power transmitter 100.

In operation 1113, the electronic device 150 may identify variation information indicating a variation in at least one of the orientation or position of the electronic device 150. In operation 1115, the electronic device 150 may transmit the variation information to the wireless power transmitter 100 via, e.g., the communication circuit 921.

In operation 1117, the wireless power transmitter 100 may select an RF wave transmission condition adjustment rule corresponding to the variation information, based on the difference between the direction of transmission of RF wave and the direction of reception of RF wave. For example, when the difference between the direction of transmission of RF wave and the direction of reception of RF wave is not more than a threshold, the wireless power transmitter 100 may adjust the RF wave transmission condition corresponding to at least one of the variation in the position or variation in the orientation of the electronic device 150. For example, the wireless power transmitter 100 may adjust the RF wave transmission condition to allow the sub RF waves to constructively interfere with one another in at least one of the orientation or position of the electronic device 150 after varied. For example, when the difference between the direction of transmission of RF wave and the direction of reception of RF wave exceeds the threshold, the wireless power transmitter 100 may perform beam steering on the entire area. Or, the wireless power transmitter 100 may adjust the RF wave transmission condition as per a predetermined adjustment rule. For example, the wireless power transmitter 100 may adjust the RF wave transmission condition so that the sub RF waves constructively interfere with one another in at least one of the orientation or position of the electronic device 150 after varied or at least one of the opposite position or orientation.

In operation 1119, the wireless power transmitter 100 may form an RF wave under a second transmission condition based on the variation information and the selected RF wave transmission condition adjustment rule. In operation 1121, the electronic device 150 may receive power based on the formed RF wave.

Figure 13:
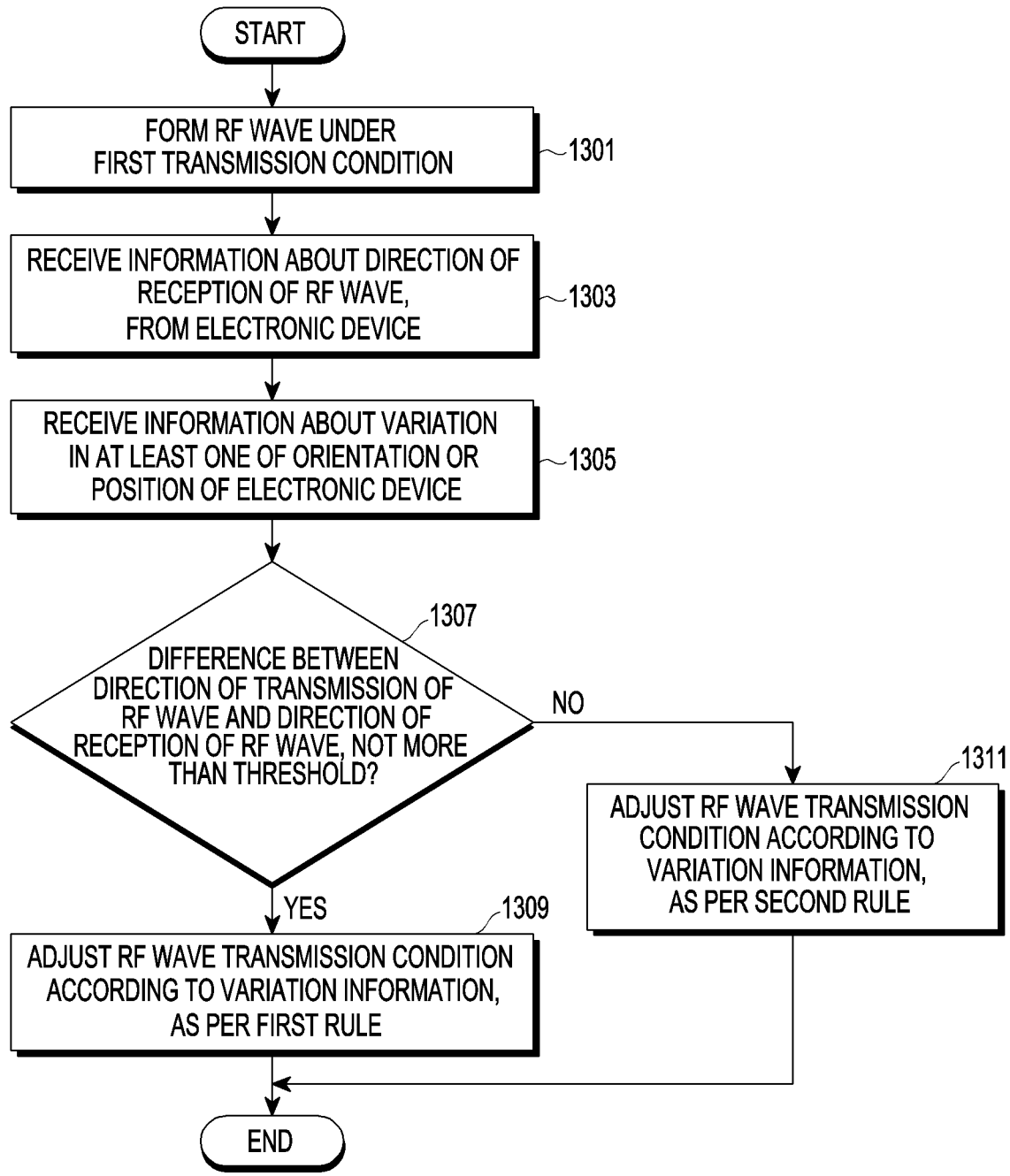
FIG. 13 is a flowchart illustrating a method for operating a wireless power transmitter according to various embodiments.
Figure 14:
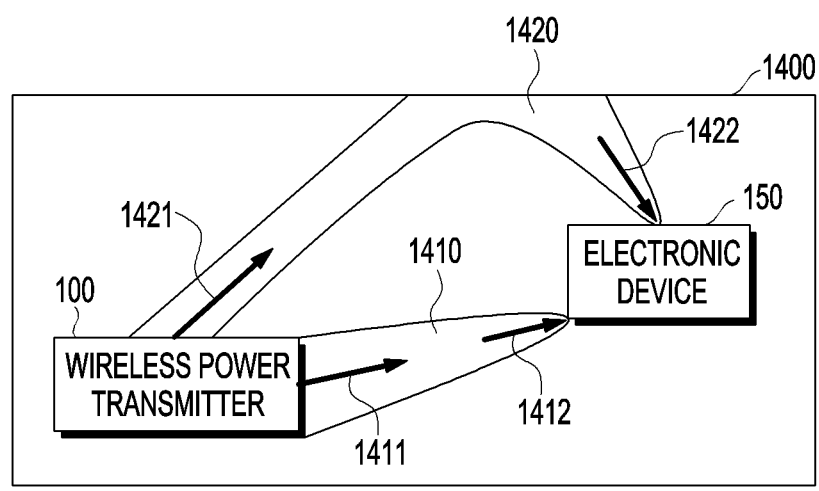
FIG. 14 is a view illustrating a deployment of a wireless power transmitter and an electronic device according to various embodiments.

FIG. 13 is a flowchart illustrating a method for operating a wireless power transmitter according to various embodiments. The embodiment related to FIG. 13 is described in greater detail with reference to FIG. 14. FIG. 14 is a view illustrating a deployment of a wireless power transmitter and an electronic device according to various embodiments.

In operation 1301, the wireless power transmitter 100 may form an RF wave under a first transmission condition. In operation 1303, the wireless power transmitter 100 may transmit the information about the direction of reception of RF wave from the electronic device 150. As described above, the electronic device 150 may identify information about the direction of reception of RF wave based on the difference in phase between the plurality of electrical signals individually output from the plurality of patch antennas, as identified from each of the plurality of phase detectors individually connected to the plurality of patch antennas of the power reception antenna array. The electronic device 150 may transmit a communication signal including the information about the direction of reception of RF wave to the wireless power transmitter 100.

In operation 1305, the wireless power transmitter 100 may receive information about a variation in at least one of the orientation or position of the electronic device 150. In operation 1307, the wireless power transmitter 100 may identify whether the difference between the direction of transmission of RF wave and the direction of reception of RF wave is not more than a threshold. For example, as shown in FIG. 14, the wireless power transmitter 100 may form an RF wave 1410 on the line of sight and charge the electronic device 150. In this case, the transmission direction 1411 in which the wireless power transmitter 100 forms the RF wave may be substantially the same as the reception direction 1412 of the RF wave by the electronic device 150.

Meanwhile, in the indoor environment 1400, the wireless power transmitter 100 may form the RF wave 1420 to be reflected by the reflection plate in the indoor environment 1400, thereby charging the electronic device 150. In this case, the transmission direction 1421 in which the wireless power transmitter 100 forms the RF wave may be different from the reception direction 1422 of the RF wave by the electronic device 150. Accordingly, when the difference between the direction of transmission of RF wave and the direction of reception of RF wave in the electronic device 150 is not more than the threshold, it may mean that the RF wave is formed on the line of sight. When the difference between the direction of transmission of RF wave and the direction of reception of RF wave in the electronic device 150 is more than the threshold, it may mean that the RF wave is formed by being reflected at least one or more times. Thus, when the RF wave is formed on the line of sight, the wireless power transmitter 100 may adjust the RF wave transmission condition to allow the sub RF waves to constructively interfere with one another in at least one of the orientation or position of the electronic device 150 after varied. On the other hand, in the case where the RF wave is formed by being reflected at least one or more times, if the RF wave transmission condition is adjusted so that the sub RF waves constructively interfere with one another in at least one of the orientation or position of the electronic device 150 after varied, the electronic device 150 may receive power at relatively low strength. Thus, in this case, the wireless power transmitter 100 may adjust the RF wave transmission condition based on a predetermined rule.

When the difference between the direction of transmission of RF wave and the direction of reception of RF wave in the electronic device 150 is not more than the threshold, the wireless power transmitter 100 may adjust the RF wave transmission condition according to the variation information, as per a first rule, in operation 1309. As described above, the wireless power transmitter 100 may adjust the RF wave transmission condition to allow the sub RF waves to constructively interfere with one another in at least one of the orientation or position of the electronic device 150 after varied. When the difference between the direction of transmission of RF wave and the direction of reception of RF wave in the electronic device 150 is more than the threshold, the wireless power transmitter 100 may adjust the RF wave transmission condition according to the variation information, as per a second rule, in operation 1311.

According to various embodiments, as per the second rule, the wireless power transmitter 100 may receive received power-related information while performing beam steering on the entire area, thereby forming an RF wave for which the received power-related information is the largest. According to various embodiments, as per the second rule, the wireless power transmitter 100 may adjust the RF wave transmission condition to allow the sub RF waves to constructively interfere with one another in at least one of the orientation or position of the electronic device 150 after primarily varied and receive the received power-related information. At this time, when the received power-related information meets a predetermined condition (e.g., when Vrec is not less than a threshold voltage), the wireless power transmitter 100 may keep on forming the corresponding RF wave. Unless the received power-related information meets the predetermined condition, the wireless power transmitter 100 may determine the optimal RF wave transmission condition via later beam steering on the entire area. According to various embodiments, as per the second rule, the wireless power transmitter 100 may adjust the RF wave transmission condition so that the sub RF waves constructively interfere with one another in at least one of the orientation or position of the electronic device 150 after varied or at least one of the opposite position or orientation. For example, upon identifying that the electronic device 150 has moved a first distance from a first point in a first direction, the wireless power transmitter 100 may determine the RF wave transmission condition to allow the sub RF waves to constructively interfere at the point the first distance away from the first point in the opposite direction to the first direction. Even in this case, after forming the RF wave, the wireless power transmitter 100 may receive the received power-related information from the electronic device 150 and, upon identifying that the received power-related information does not meet the predetermined condition, determine the optimal RF wave transmission condition via beam steering on the entire area.

Figure 15:
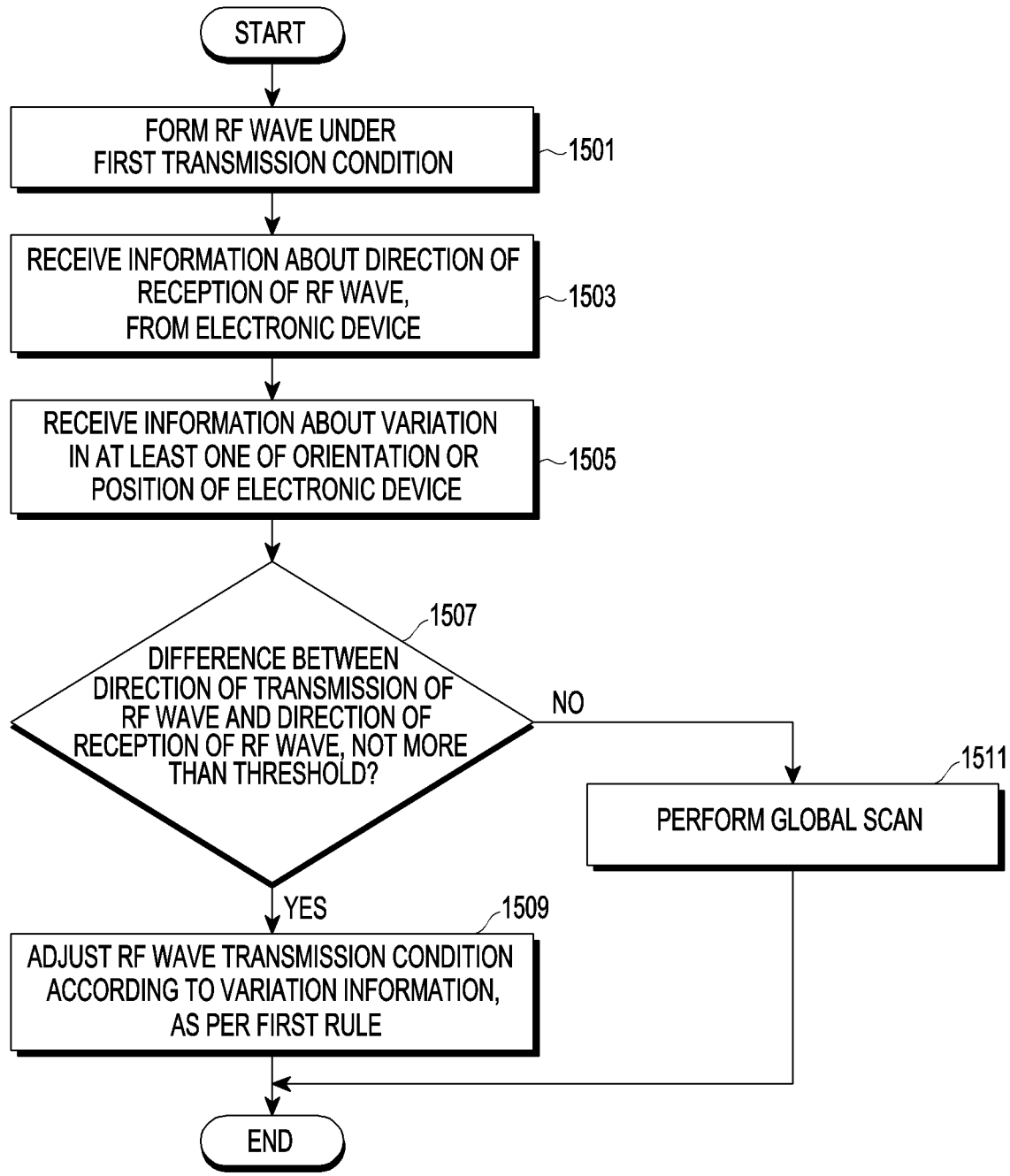
FIG. 15 is a flowchart illustrating a method for operating a wireless power transmitter according to various embodiments.
Figure 16:
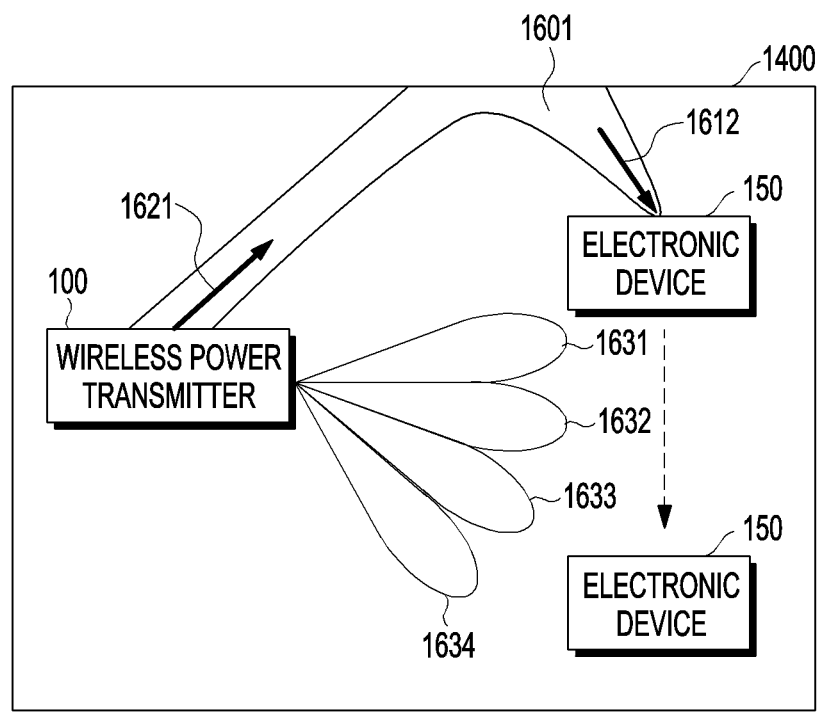
FIG. 16 is a view illustrating an example of performing a global scan by a wireless power transmitter according to various embodiments.

FIG. 15 is a flowchart illustrating a method for operating a wireless power transmitter according to various embodiments. Various embodiments is described in detail with reference to FIG. 15 along with FIG. 16. FIG. 16 is a view illustrating an example of performing a global scan by a wireless power transmitter according to various embodiments.

According to various embodiments, in operation 1501, the wireless power transmitter 100 may form an RF wave under a first transmission condition. In operation 1503, the wireless power transmitter 100 may transmit the information about the direction of reception of RF wave from the electronic device 150. In operation 1505, the wireless power transmitter 100 may receive information about a variation in at least one of the orientation or position of the electronic device 150. In operation 1507, the wireless power transmitter 100 may identify whether the difference between the direction of transmission of RF wave and the direction of reception of RF wave in the electronic device 150 is not more than a threshold. When the difference between the direction of transmission of RF wave and the direction of reception of RF wave in the electronic device 150 is identified to be not more than the threshold, the wireless power transmitter 100 may adjust the RF wave transmission condition according to the variation information, as per a first rule, in operation 1509. For example, as described above, the wireless power transmitter 100 may adjust the RF wave transmission condition to allow the sub RF waves to constructively interfere with one another in at least one of the orientation or position of the electronic device 150 after varied.

Meanwhile, when the difference between the direction of transmission of RF wave and the direction of reception of RF wave in the electronic device 150 is identified to be more than the threshold, the wireless power transmitter 100 may perform a global scan, in operation 1511. For example, when the RF wave 1601 is formed by reflection as shown in FIG. 16, the wireless power transmitter 100 may identify that the difference between the transmission direction 1611 of the RF wave 1601 and the reception direction 1612 of the RF wave 1601 in the electronic device 150 exceeds the threshold. Corresponding thereto, the wireless power transmitter 100 may form RF waves 1631, 1632, 1633, and 1634 for the entire area. The wireless power transmitter 100 may compare the pieces of received power-related information received while forming the RF waves 1631, 1632, 1633, and 1634. The wireless power transmitter 100 may form the RF wave (e.g., the RF wave 1633) for which the received power-related information is largest and charge the electronic device 150.

Figure 17:
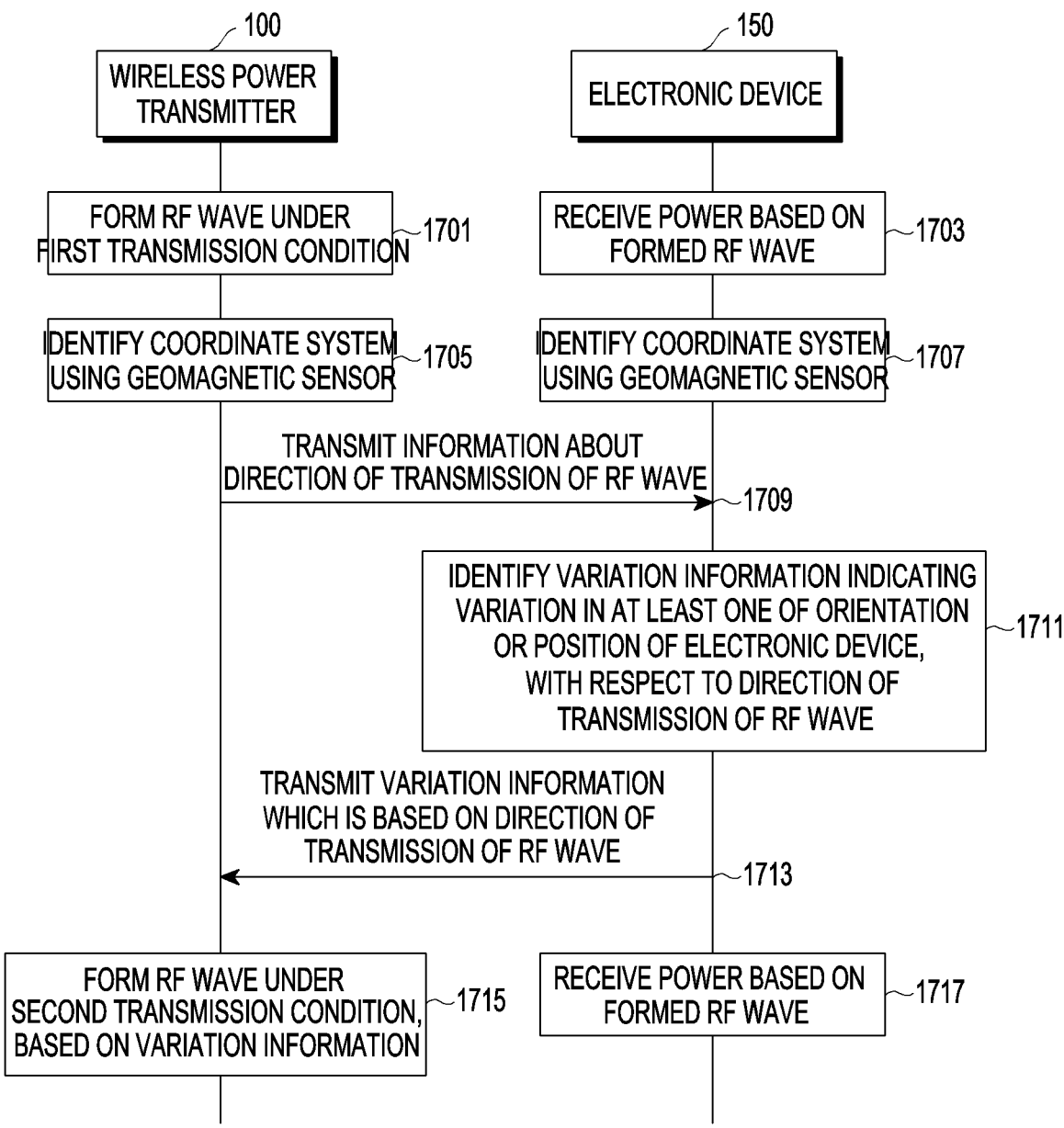
FIG. 17 is a flowchart illustrating a method of operating a wireless power transmitter and an electronic device according to various embodiments.

FIG. 17 is a flowchart illustrating a method of operating a wireless power transmitter and an electronic device according to various embodiments.

According to various embodiments, in operation 1701, the wireless power transmitter 100 may form an RF wave under a first transmission condition. In operation 1703, the electronic device 150 may receive power based on the formed RF wave. In operation 1705, the wireless power transmitter 100 may identify the coordinate system using the geo-magnetic sensor. In operation 1707, the electronic device 150 may identify the coordinate system using the geo-magnetic sensor.

In operation 1709, the wireless power transmitter 100 may transmit the information about the direction of transmission of RF wave. For example, the wireless power transmitter 100 may identify the direction vector indicating the direction of transmission of RF wave in the absolute coordinate system. The wireless power transmitter 100 may transmit a communication signal including the direction vector to the electronic device 150.

In operation 1711, the electronic device 150 may identify variation information indicating a variation in at least one of the orientation or position of the electronic device, with respect to the direction of transmission of RF wave. For example, the electronic device 150 may identify the variation in at least one of the orientation or position of the electronic device with respect to the direction vector indicating the direction of transmission of RF wave in the absolute coordinate system. In operation 1713, the electronic device 150 may transmit the variation information, which is based on the direction of transmission of RF wave, to the wireless power transmitter 100.

According to various embodiments, the wireless power transmitter 100 may form an RF wave under a second transmission condition, based on the variation information in operation 1715. In operation 1717, the electronic device 150 may receive power based on the formed RF wave.

Figure 18:
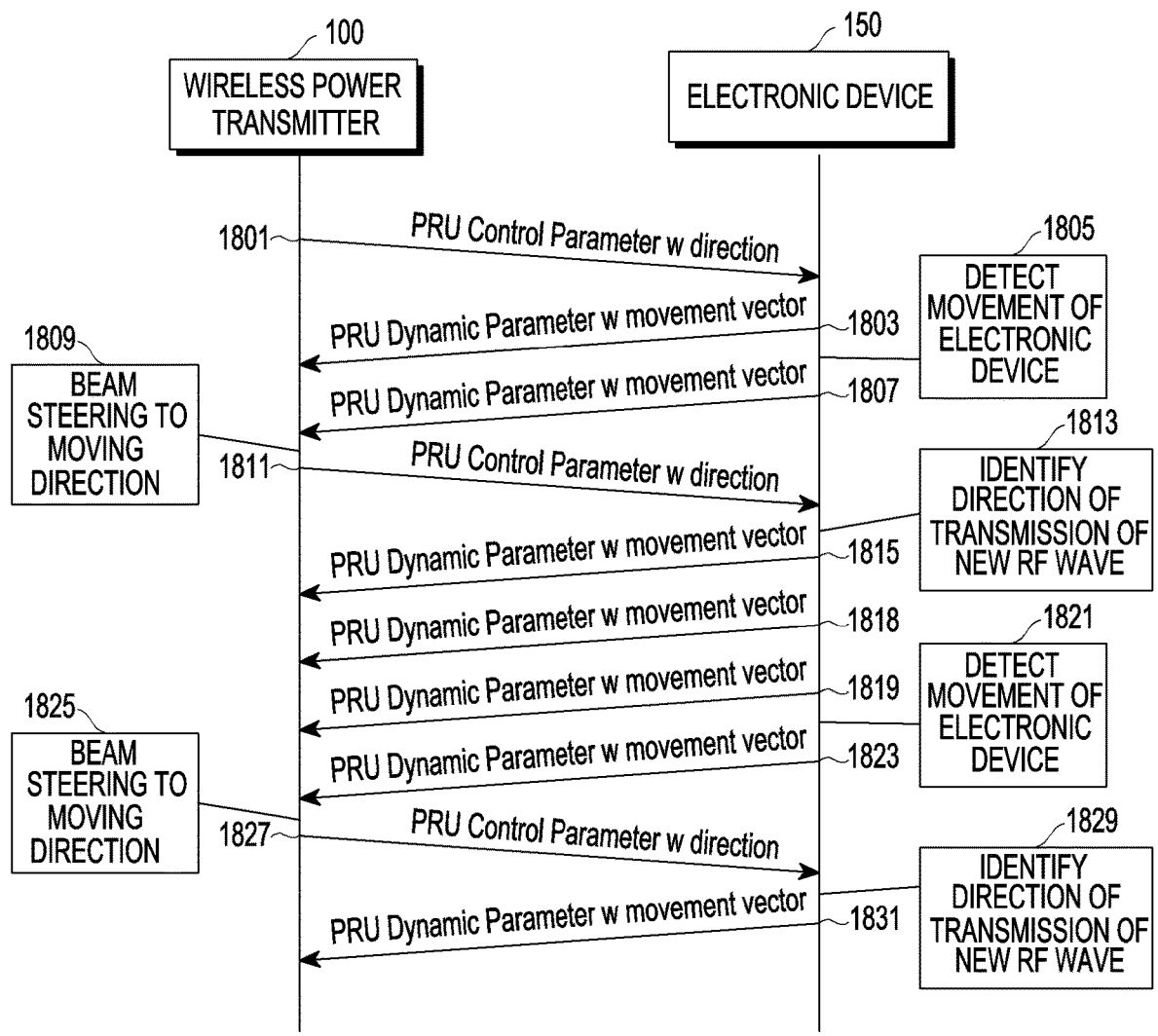
FIG. 18 is a flowchart illustrating a method of operating a wireless power transmitter and an electronic device according to various embodiments.

FIG. 18 is a flowchart illustrating a method of operating a wireless power transmitter and an electronic device according to various embodiments.

According to various embodiments, the wireless power transmitter 100 may transmit a communication signal (e.g., PRU Control Parameter) including information about the direction of the RF wave to the electronic device 150 in operation 1801. The PRU Control Parameter may be a communication signal defined by, e.g., the air fuel alliance (AFA) and may be a communication signal for the power transmitting unit (PTU) to transmit information to the power receiving unit (PRU). For example, the direction of the RF wave may be represented with two angles in the spherical coordinate system, but the representation is not limited thereto.

In operation 1803, the electronic device 150 may transmit a communication signal (e.g., PRU Dynamic Parameter) including the movement vector to the wireless power transmitter 100. According to various embodiments, the electronic device 150 may transmit the communication signal including the movement vector, which is based on the direction of the RF wave, to the wireless power transmitter 100. The PRU Dynamic Parameter may be a communication signal defined by, e.g., the AFA standard and may be a communication signal for the PRU to transmit information to the PTU. The PRU Dynamic Parameter may include at least one of the displacement, speed, or acceleration of the electronic device 150 in, e.g., the spherical coordinate system. In operation 1805, the electronic device 150 may detect a movement of the electronic device 150. In operation 1807, the electronic device 150 may transmit the PRU Dynamic Parameter including the corrected movement information about the electronic device 150 to the wireless power transmitter 100.

In operation 1809, the wireless power transmitter 100 may perform beam steering in the direction of movement. The wireless power transmitter 100 may adjust the RF wave transmission condition based on the movement of the electronic device identified based on the direction of the RF wave. Although not shown, the wireless power transmitter 100 may receive received power-related information from the electronic device 150 during the beam steering and, based thereupon, identify the RF wave transmission condition for wireless charging. In operation 1811, the wireless power transmitter 100 may transmit a PRU Control Parameter including information about the direction of the new RF wave to the electronic device 150. In operation 1813, the electronic device 150 may identify the direction of transmission of the new RF wave. In operations 1815, 1817, and 1819, the electronic device 150 may transmit the PRU Dynamic Parameter according to the transmission period of the PRU Dynamic Parameter. The electronic device 150 may identify the movement information with respect to the direction of transmission of the new RF wave and transmit it to the wireless power transmitter 100. In operation 1821, the electronic device 150 may detect a movement of the electronic device 150. In operation 1823, the electronic device 150 may transmit the PRU Dynamic Parameter including the movement information to the wireless power transmitter 100 using a new criterion.

In operation 1825, the wireless power transmitter 100 may perform beam steering in the direction of movement. Although not shown, the wireless power transmitter 100 may receive received power-related information from the electronic device 150 during the beam steering and, based thereupon, identify the RF wave transmission condition for wireless charging. In operation 1827, the wireless power transmitter 100 may transmit a PRU Control Parameter including information about the direction of the new RF wave to the electronic device 150. In operation 1829, the electronic device 150 may identify the direction of transmission of the new RF wave. In operation 1831, the electronic device 150 may transmit the PRU Dynamic Parameter.

Figure 19:
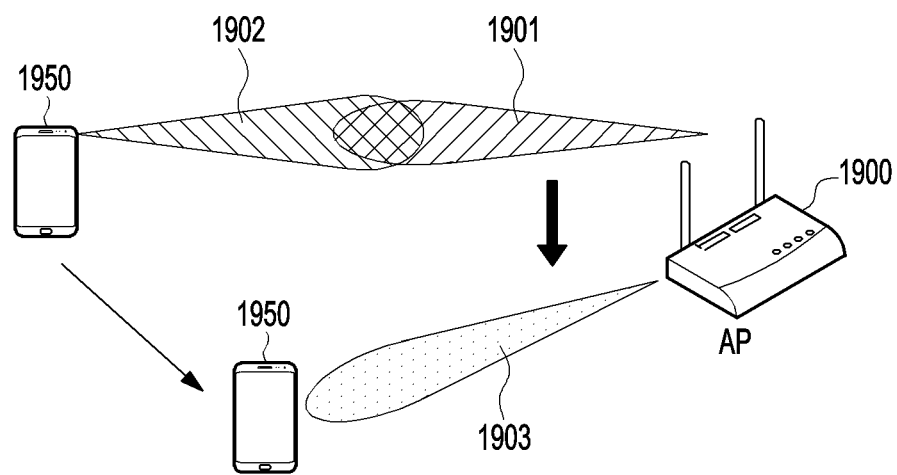
FIG. 19 is a view illustrating an electronic device performing beamforming and beam formation by an access point (AP) according to various embodiments.

FIG. 19 is a view illustrating an electronic device performing beamforming and beam formation by an access point (AP) according to various embodiments.

An electronic device 1950 may access an AP 1900 via a beyond 4G network communication system or post-long-term evolution (post-LTE) system or a 5G communication system or pre-5G communication system. The electronic device 1950 may access the access point (AP) via an ultra-high frequency band (hereinafter, 'mmWave' band) of, e.g., several tens of GHz or more (e.g., a frequency band ranging from 10 GHz to 300 GHz and with a resonance frequency wavelength ranging from about 1 mm to 30 mm). Specifically, the electronic device 1950 may access the AP 1900 via, e.g., the Institute of Electrical and Electronics Engineers (IEEE) 802.11ad (WiGig) standard. Or, the electronic device 1950 may access the AP 1900 in an ultra-high frequency band such as a millimeter wave (mmWave) (a band of tens of GHz, for example, about 60 GHz). To mitigate pathloss on the mmWave band and increase the reach of radio waves, the following techniques are taken into account for the 5G communication system or IEEE 802.11ad standard: beamforming, massive multi-input multi-output (MIMO), full dimensional MIMO (FD-MIMO), array antenna, analog beamforming, and large scale antenna.

The AP 1900 may include a plurality of antennas and may thus form a first beam 1901 that is directional. The electronic device 1950 may include a plurality of antennas and may thus form a second beam 1902 that is directional. Thus, the AP 1900 and the electronic device 1950 may perform communication with high reliability even in a high-frequency band having high straightness.

It will be easily appreciated by one of ordinary skill in the art that the AP 1900 and the electronic device 1950 may further include, for performing various communications described above, a communication processor (CP), a modulator, a demodulator, a radio frequency IC (RFIC), an intermediate frequency IC (IFIC), a transceiver, an array antenna, a phase shifter, and a power amplifier. Specifically, the AP 1900 or the electronic device 1950 may modulate the baseband signal into the radio frequency (RF) signal or intermediate frequency (IF) signal via the modulator. The AP 1900 or the electronic device 1950 may demodulate the received RF signal or IF signal into the baseband signal via, e.g., the demodulator.

According to various embodiments, the AP 1900 or the electronic device 1950 may receive the modulated RF signal and perform amplification and/or radio signal processing thereon, and transmit the resultant signal to the radio space via each array antenna. According to various embodiments, the AP 1900 or the electronic device 1950 may receive the modulated IF signal, convert it into an RF signal, and perform amplification and/or radio signal processing on the converted signal, and transmit the resultant signal to the radio space via the array antenna.

The AP 1900 or the electronic device 1950 may adjust at least one of the strength or direction of the beams 1901 and 1902 by adjusting at least one of the phase or magnitude of each converted signal input to the array antenna. The AP 1900 or the electronic device 1950 may identify the beam (1901 and 1902) formation condition based on at least one of the orientation or position of, e.g., the other party's device. Meanwhile, at least one of the orientation or position of the electronic device 1950 may be varied in which case the AP 1900 may form a third beam 1903 based on at least one of the orientation or position of the electronic device 1950 after varied. However, if the AP 1900 fails to identify information about at least one of the orientation or position of the electronic device 1900 after varied, the time to identify the beam formation condition for the beam 1903 may be increased, so that communication may be discontinued.

Figure 20:
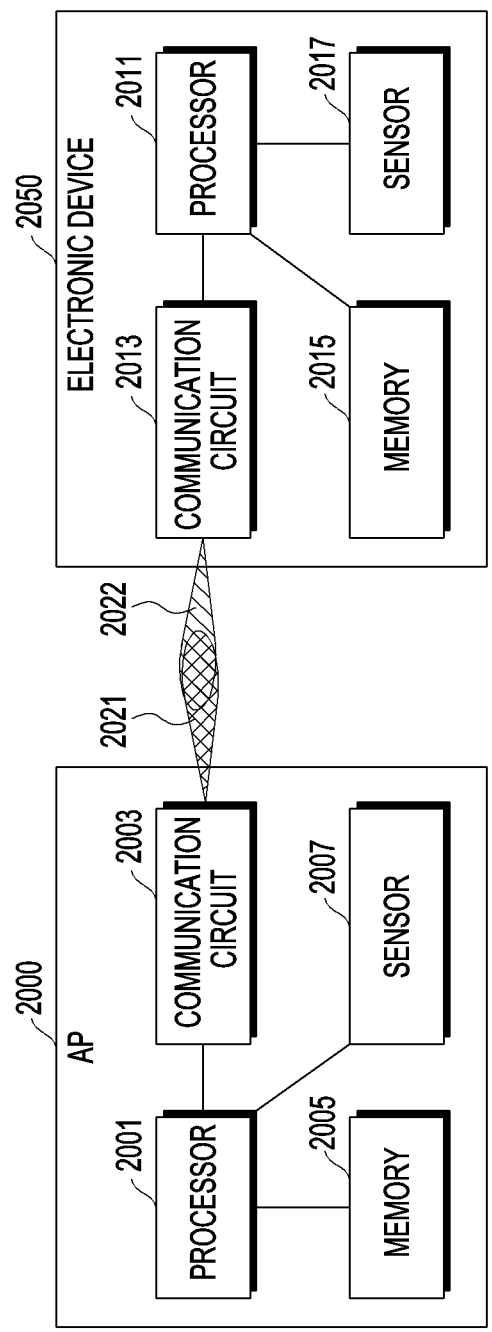
FIG. 20 is a block diagram illustrating an AP and an electronic device according to various embodiments.

FIG. 20 is a block diagram illustrating an AP and an electronic device according to various embodiments.

Referring to FIG. 20, an AP 2000 may include a processor 2001, a communication circuit 2003, a memory 2005, and a sensor 2007. The electronic device 2050 may include a processor 2011, a communication circuit 2013, a memory 2015, and a sensor 2017. The processor 2001 may form a beam for communication via the communication circuit 2003. The processor 2001 may form a beam 2021 for communication based on at least one of the orientation or position of the electronic device 2050. Meanwhile, the processor 2001 may configure an absolute coordinate system based on the geo-magnetic field identified via the sensor 2007.

The processor 2011 of the electronic device 2050 may configure the absolute coordinate system based on, at least, the geo-magnetic field identified via the sensor 2017. Thus, the AP 2000 and the electronic device 2050 may share the same absolute coordinate system. The electronic device 2050 may identify a variation in at least one of the orientation or position of the electronic device 2050 in the absolute coordinate system based on the sensing data from the sensor 2017 (e.g., at least one of a gyro sensor or linear accelerometer) The electronic device 2050 may transmit a variation in at least one of the orientation or position of the electronic device 2050 in the absolute coordinate system to the AP 2000 using the beam 2022 for communication. The communication circuit 2003 and the communication circuit 2013 may be communication circuits for forming various beams as described above.

According to various embodiments, the AP 2000 may adjust the beam formation condition based on, at least, the information related to the received variation. As described above, since the AP 2000 and the electronic device 2050 share the absolute coordinate system, the beam formation condition may be adjusted to allow the sub beams to constructively interfere in at least one of the orientation or position of the electronic device 2050 after varied, based on the information related to the variation received from the electronic device 2050. Accordingly, it is possible to stably perform communication even when the electronic device 2050 moves.

According to various embodiments, the memory 2005 may store association information between the beam formation condition and at least one of the orientation or position of the electronic device 2050, for example. The memory 2015 may also store the association information between the condition of forming the beam by the electronic device 2050 and at least one of the orientation or position of the electronic device 2050.

Figure 21:
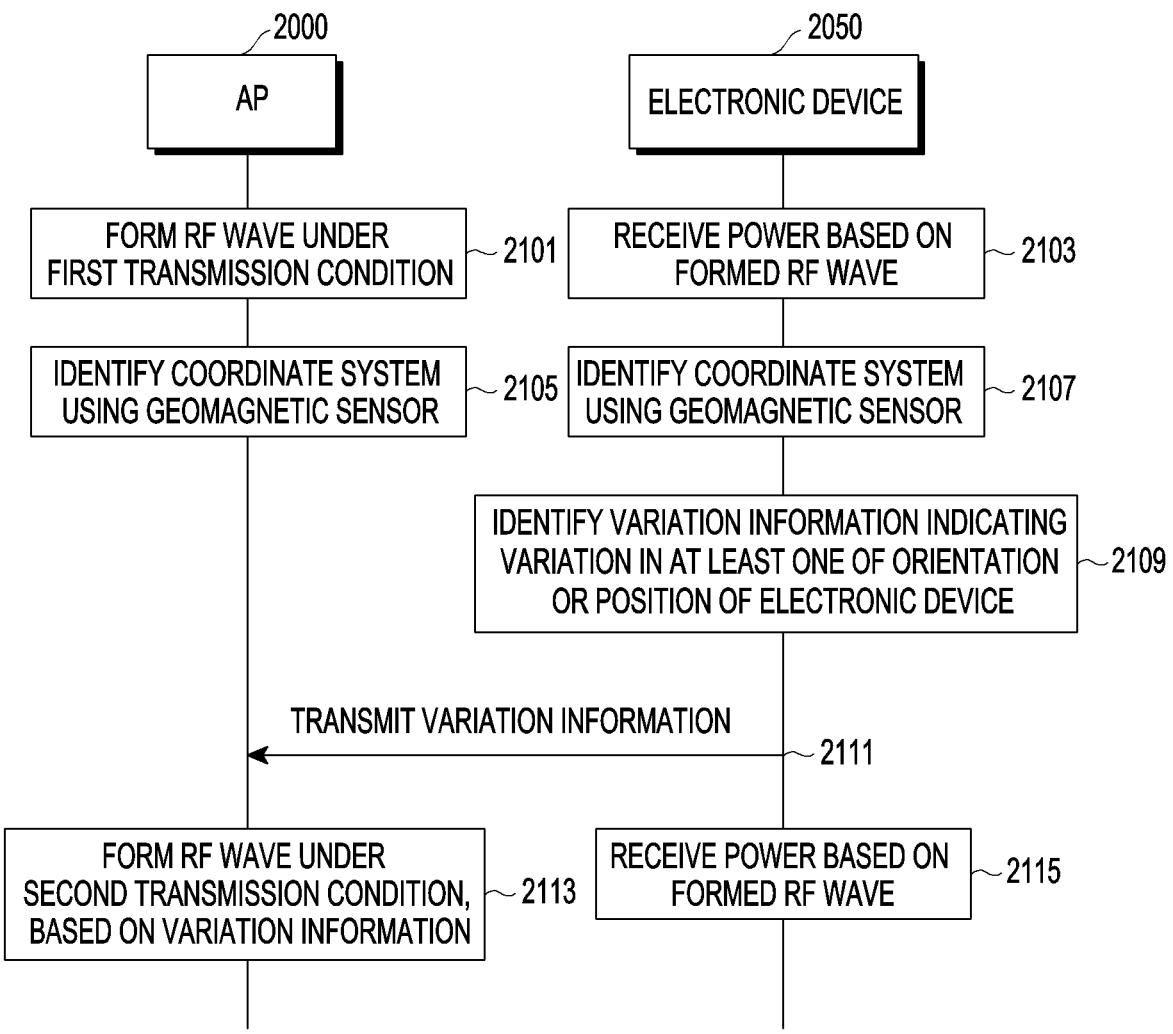
FIG. 21 is a flowchart illustrating a method for operating an AP and an Electronic Device According to Various Embodiments.

FIG. 21 is a flowchart illustrating a method for operating an AP and an electronic device according to various embodiments.

According to various embodiments, the AP 2000 may form an RF wave (e.g., beam) under a first transmission condition in operation 2101. In operation 2103, the electronic device 2050 may perform communication based on the formed RF wave. In operation 2105, the AP 2000 may identify the coordinate system using the geo-magnetic sensor. In operation 2107, the electronic device 2050 may identify the coordinate system using the geo-magnetic sensor. In operation 2109, the electronic device 150 may identify variation information indicating a variation in at least one of the orientation or position of the electronic device 150. The electronic device 150 may identify variation information indicating a variation in at least one of the orientation or position of the electronic device 150 in the absolute coordinate system. In operation 2111, the electronic device 150 may transmit the variation information to the AP 2000. According to various embodiments, the electronic device 150 may increase the beam width for more stable communication while on the move.

In operation 2113, the AP 2000 may form an RF wave (e.g., beam) under a second transmission condition, based on the variation information. In operation 2115, the electronic device 150 may perform communication based on the formed RF wave. Further, the electronic device 150 may adjust the condition of forming the beam by the electronic device 150, based on a variation in at least one of the orientation or position of the electronic device 150.

In other words, the spirit of the disclosure is applicable to all beamforming required technology, as well as wireless power transmission/reception.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may modify corresponding components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., a program) containing commands that are stored in a machine (e.g., computer)-readable storage medium (e.g., an internal memory) or an external memory. The machine may be a device that may invoke a command stored in the storage medium and may be operated as per the invoked command. The machine may include an electronic device and wireless power transmitter according to embodiments disclosed herein. When the command is executed by a processor, the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to various embodiments, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (preintegration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

The invention claimed is:

1. A wireless power transmitter, comprising:
a plurality of power transmission antennas configured to form a radio frequency (RF) wave;
a geo-magnetic sensor;
a processor; and
a communication circuit,
wherein the processor is configured to:
configure a first coordinate system based on, at least, geomagnetic sensing information from the geo-magnetic sensor of the wireless power transmitter;
control to form a first RF wave under a first transmission condition, via the plurality of power transmission antennas, to charge an electronic device;
receive first information about a variation in at least one of an orientation or a position of the electronic device, via the communication circuit, from the electronic device, wherein the first information is identified in a second coordinate system corresponding to the first coordinate system, identified via a geo-magnetic sensor of the electronic device;
identify at least one of a varied orientation or a varied position of the electronic device in the configured coordinate system, based on, at least, the first information; and
control to form a second RF wave under a second transmission condition identified based on, at least, at least one of the varied orientation or the varied position of the electronic device, via the plurality of power transmission antennas.

2. The wireless power transmitter of claim 1, wherein the processor is further configured to, after forming the second RF wave, form a third RF wave, via the plurality of power transmission antennas, based on a third transmission condition at least partially different from the second transmission condition of the second RF wave.

3. The wireless power transmitter of claim 2, wherein the processor is further configured to:
receive, via the communication circuit, information about a received strength of the second RF wave and information about a received strength of the third RF wave, from the electronic device; and
compare the information about the received strength of the second RF wave with the information about the received strength of the third RF wave and form, via the plurality of power transmission antennas, an RF wave corresponding to a larger received strength based on a result of the comparison.

4. The wireless power transmitter of claim 1, wherein the processor is configured to, as part of forming the second RF wave under the second transmission condition identified based on, at least, at least one of the varied orientation or the varied position of the electronic device:
identify a distance between the wireless power transmitter and the electronic device; and
identify at least one of the varied orientation or the varied position of the electronic device based on the first information and the distance between the wireless power transmitter and the electronic device.

5. The wireless power transmitter of claim 1, wherein the processor is further configured to:
receive, via the communication circuit, information about a direction of reception of the first wave, from the electronic device; and
identify a difference between a direction of transmission of the first RF wave and the direction of reception of the first RF wave.

6. The wireless power transmitter of claim 5, wherein the processor is configured to, as part of forming the second RF wave under the second transmission condition identified based on, at least, at least one of the varied orientation or the varied position of the electronic device:
upon identifying that the difference between the direction of transmission of the first RF wave and the direction of reception of the first RF wave is not more than a threshold, identify the second transmission condition of the second RF wave to allow constructive interference to occur in at least one of the varied orientation or the varied position of the electronic device.

7. The wireless power transmitter of claim 6, wherein the processor is configured to, as part of forming the second RF wave under the second transmission condition identified based on, at least, at least one of the varied orientation or the varied position of the electronic device:
upon identifying that the difference between the direction of transmission of the first RF wave and the direction of reception of the first RF wave is more than the threshold, identify the second transmission condition of the second RF wave to allow constructive interference to occur under a condition different from at least one of the varied orientation or the varied position of the electronic device.

8. The wireless power transmitter of claim 7, wherein the processor is further configured to:
receive reception power-related information from the electronic device via the communication circuit while forming the second RF wave via the plurality of power transmission antennas to allow constructive interference to occur under the different condition; and
upon identifying that the reception power-related information does not meet a predetermined condition, control to form a plurality of RF waves via the plurality of power transmission antennas for an entire area.

9. The wireless power transmitter of claim 5, wherein the processor is configured to, as part of forming the second RF wave under the second transmission condition identified based on, at least, at least one of the varied orientation or the varied position of the electronic device:
upon identifying that the difference between the direction of transmission of the first RF wave and the direction of reception of the first RF wave is more than the threshold, control to form a plurality of RF waves via the plurality of power transmission antennas for an entire area;
receive, from the electronic device, each of a plurality of pieces of power reception-related information via the communication circuit while forming each of the plurality of RF waves; and
control to form, via the plurality of power transmission antennas, an RF wave corresponding to maximum power reception-related information among the plurality of pieces of power reception-related information.

10. A method for operating a wireless power transmitter, the method comprising:

configuring a first coordinate system based on, at least, geomagnetic sensing information from a geo-magnetic sensor of the wireless power transmitter;

forming a first RF wave under a first transmission condition, to charge an electronic device;

receiving first information about a variation in at least one of an orientation or a position of the electronic device, from the electronic device, wherein the first information is identified in a second coordinate system corresponding to the first coordinate system, identified via a geo-magnetic sensor of the electronic device;

identifying at least one of a varied orientation or a varied position of the electronic device in the configured coordinate system, based on, at least, the first information; and forming a second RF wave under a second transmission condition identified based on, at least, at least one of the varied orientation or the varied position of the electronic device.

11. The method of claim 10, further comprising, after forming the second RF wave, forming a third RF wave based on a third transmission condition at least partially different from the second transmission condition of the second RF wave.

12. The method of claim 11, further comprising:

receiving information about a received strength of the second RF wave and information about a received strength of the third RF wave, from the electronic device; and comparing the information about the received strength of the second RF wave with the information about the received strength of the third RF wave and forming an RF wave corresponding to a larger received strength based on a result of the comparison.

13. The method of claim 10, wherein forming the second RF wave under the second transmission condition identified based on, at least, at least one of the varied orientation or the varied position of the electronic device comprises:

identifying a distance between the wireless power transmitter and the electronic device; and identifying at least one of the varied orientation or the varied position of the electronic device based on the first information and the distance between the wireless power transmitter and the electronic device.

* * * * *